(12) United States Patent
Fujii

(10) Patent No.: US 8,279,298 B2
(45) Date of Patent: Oct. 2, 2012

(54) IMAGING APPARATUS HAVING IMPROVED USABILITY WHEN MOVING IMAGES AND STILL IMAGES ARE RECORDED

(75) Inventor: Akio Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 677 days.

(21) Appl. No.: 12/404,169

(22) Filed: Mar. 13, 2009

(65) Prior Publication Data

US 2009/0237519 A1  Sep. 24, 2009

(30) Foreign Application Priority Data

Mar. 18, 2008 (JP) .................... 2008-070420
Feb. 27, 2009 (JP) .................... 2009-046424

(51) Int. Cl.
*H04N 5/225* (2006.01)
*H04N 5/235* (2006.01)
*H04N 5/76* (2006.01)

(52) U.S. Cl. ............... 348/220.1; 348/221.1; 348/231.2

(58) Field of Classification Search ............... 348/220.1, 348/221.1, 231.2
See application file for complete search history.

(56) References Cited

U.S. PATENT DOCUMENTS

| | | | | |
|---|---|---|---|---|
| 4,774,562 A * | 9/1988 | Chen et al. | | 375/240.01 |
| 6,556,242 B1 * | 4/2003 | Dunton et al. | | 348/220.1 |
| 7,058,721 B1 * | 6/2006 | Ellison et al. | | 709/231 |
| 7,110,025 B1 * | 9/2006 | Loui et al. | | 348/220.1 |
| 7,474,794 B2 * | 1/2009 | Boneh et al. | | 382/239 |
| 2002/0140826 A1 * | 10/2002 | Sato et al. | | 348/222.1 |
| 2003/0039398 A1 * | 2/2003 | McIntyre | | 382/239 |
| 2003/0128760 A1 * | 7/2003 | Lee et al. | | 375/240.16 |
| 2003/0169335 A1 * | 9/2003 | Monroe | | 348/143 |
| 2003/0204849 A1 * | 10/2003 | Watanabe | | 725/62 |
| 2005/0259158 A1 * | 11/2005 | Jacob et al. | | 348/218.1 |
| 2007/0047642 A1 * | 3/2007 | Erlandson | | 375/240.01 |
| 2007/0273762 A1 * | 11/2007 | Steensma et al. | | 348/143 |
| 2008/0012988 A1 * | 1/2008 | Baharav et al. | | 348/586 |
| 2008/0117294 A1 * | 5/2008 | McCutchen | | 348/143 |
| 2008/0122938 A1 * | 5/2008 | Broberg et al. | | 348/222.1 |
| 2008/0165843 A1 * | 7/2008 | Dvir et al. | | 375/240.01 |

FOREIGN PATENT DOCUMENTS

| | | |
|---|---|---|
| JP | 7-284058 A | 10/1995 |
| JP | 9-233410 A | 9/1997 |
| JP | 2005-012378 A | 1/2005 |

* cited by examiner

*Primary Examiner* — Aung S Moe
*Assistant Examiner* — Chia-Wei A Chen
(74) *Attorney, Agent, or Firm* — Canon USA Inc IP Division

(57) ABSTRACT

An imaging apparatus includes a signal processing unit that generates moving image data and still image data using image data output from an imaging unit, a moving image coding unit that encodes the moving image data, a still image coding unit that encodes the still image data, a recording unit that records the coded moving and still image data on a recording medium, a setting unit that sets a data rate of the coded moving image data, and a control unit that controls the moving and still image coding units. The control unit controls the moving image coding unit based on the set data rate to adjust the data rate of the moving image data and the still image coding unit based on the set data rate and a recording data rate of the recording medium to adjust an amount of the still image data.

34 Claims, 13 Drawing Sheets

IMAGING APPARATUS HAVING IMPROVED USABILITY WHEN MOVING IMAGES AND STILL IMAGES ARE RECORDED

BACKGROUND OF THE INVENTION

1. Field of the Invention

The present invention relates generally to imaging apparatuses. More particularly, the present invention relates to a technique suitable for shooting of moving images and still images.

2. Description of the Related Art

Video cameras for shooting images and recording the images on a recording medium, such as a memory card, are available. With a recent increase in the number of pixels of an image pickup element of the video cameras, shooting of high-definition still images as well as moving images has been realized. In addition, some video cameras can shoot still images during shooting of moving images. In such video cameras, still images can be shut in response to pressing of a shutter button during recording of moving images.

For example, a video camera disclosed in Japanese Patent Laid-Open No. 7-284058 encodes moving images according to the MPEG standard before recording the moving images. In response to a still image shooting instruction issued during recording of moving images, the video camera encodes a moving image as an intra-frame (I-frame). The video camera records the I-frame as still image data in a memory and then records the still image data on a recording medium after termination of shooting of the moving images.

In addition, a video camera disclosed in Japanese Patent Laid-Open No. 9-233410 has a buffer memory for still images. In response to a still image shooting request issued during recording of moving images, the video camera temporarily stores still image data in the buffer memory. After termination of recording of moving image data, the video camera reads out the still image data from the buffer memory and records the still image data on a recording medium.

An image recording apparatus disclosed in Japanese Patent Laid-Open No. 2005-12378 records moving image data on a first recording medium. In response to a still image shooting request issued during recording of moving image data, the image recording apparatus records the still image data on a second recording medium. After termination of recording of moving image data, the image recording apparatus copies the still image data recorded on the second recoding medium on the first recording medium.

However, the video camera disclosed in Japanese Patent Laid-Open No. 7-284058 records, as an I-frame, a frame corresponding to a timing of the still image shooting instruction issued during shooting of moving images. Accordingly, the image quality of reproduced moving image data undesirably decreases.

Additionally, the video camera disclosed in Japanese Patent Laid-Open No. 9-233410 records still image data in a buffer memory in response to a still image shooting instruction issued during shooting of moving images and then records the still image data on a recording medium after termination of shooting of moving images. If the video camera uses up an available buffer memory during shooting of moving images, the video camera can no longer shoot still images undesirably. In addition, since the video camera records still image data stored in the buffer on a recording medium after termination of shooting of moving images, a user may be unable to immediately perform a following operation, such as image shooting, until the video camera finishes recording the still image data on the recording medium.

Furthermore, the image recording apparatus disclosed in Japanese Patent Laid-Open No. 2005-12378 records still image data on another recording medium, which is different from a recording medium for storing moving image data, in response to a still image shooting instruction issued during shooting of moving images. After termination of shooting of moving images, the image recording apparatus records the still image data recorded on the other recording medium on the recording medium storing the moving image data. Accordingly, a user may be unable to immediately perform a following operation, such as image shooting, until the image recording apparatus finishes recording the still image data on the recording medium storing the moving image data after termination of shooting of moving images. In addition, the image recording apparatus has to be able to record moving images and still images on a plurality of recording media.

As described above, in the techniques disclosed in the above-cited documents, a still image is temporarily stored in a buffer memory in response to a still image shooting instruction issued during shooting of moving images. The still image is then recorded after termination of recording of moving images. Accordingly, if an available buffer memory for still images is used up during shooting of moving images, a restriction that no other still images can be shot and a restriction that a user cannot immediately perform a following operation after termination of recording of moving images are caused.

Thus, usability is unpreferable in the related art.

SUMMARY OF THE INVENTION

The present invention improves usability when moving images and still images are recorded.

According to an aspect of the present invention, an imaging apparatus includes an imaging unit, a signal processing unit configured to generate moving image data and still image data using image data output from the imaging unit, a moving image coding unit configured to encode the moving image data to compress an information amount of the moving image data, a still image coding unit configured to encode the still image data to compress an information amount of the still image data, a recording unit configured to record the moving image data encoded by the moving image coding unit and the still image data encoded by the still image coding unit on a recording medium, a setting unit configured to set a data rate of the moving image data to be encoded by the moving image coding unit, and a control unit configured to control the moving image coding unit and the still image coding unit. The control unit controls the moving image coding unit on the basis of the data rate set by the setting unit to adjust a data rate of the moving image data. The control unit controls the still image coding unit on the basis of the data rate set by the setting unit and a recording data rate of the recording medium to adjust an amount of the still image data.

According to another aspect of the present invention, an imaging apparatus includes an imaging unit, a signal processing unit configured to generate moving image data and still image data using image data output from the imaging unit, a moving image coding unit configured to encode the moving image data to compress an information amount of the moving image data, a still image coding unit configured to encode the still image data to compress an information amount of the still image data, a recording unit configured to record the moving image data encoded by the moving image coding unit and the still image data encoded by the still image coding unit on a recording medium, a setting unit configured to set an image quality of the still image data to be encoded by the still image coding unit, and a control unit configured to control the moving image coding unit and the still image coding unit. The control unit controls the still image coding unit on the basis of the image quality set by the setting unit to adjust an amount of the still image data. The control unit controls the moving image coding unit on the basis of the amount of the still image data encoded in accordance with the set image quality and a recording data rate of the recording medium to adjust a data rate of the moving image data.

According to still another aspect, an imaging apparatus includes an imaging unit, a signal processing unit configured to generate moving image data and still image data using image data output from the imaging unit, a moving image coding unit configured to encode the moving image data to compress an information amount of the moving image data, a still image coding unit configured to encode the still image data to compress an information amount of the still image data, a recording unit configured to record the moving image data encoded by the moving image coding unit and the still image data encoded by the still image coding unit on a recording medium, a setting unit configured to set a data rate of the moving image data to be encoded by the moving image coding unit and an image quality of the still image data to be encoded by the still image coding unit, a selecting unit configured to select one of a first mode and a second mode, and a control unit configured to control the moving image coding unit and the still image coding unit in accordance with the mode selected by the selecting unit. In the first mode, the control unit controls the moving image coding unit on the basis of the data rate set by the setting unit to adjust the data rate of the moving image data and controls the still image coding unit on the basis of the set data rate and a recording data rate of the recording medium to adjust an amount of the still image data. In the second mode, the control unit controls the still image coding unit on the basis of the image quality set by the setting unit to adjust the amount of the still image data and controls the moving image coding unit on the basis of the amount of the still image data encoded in accordance with the set image quality and the recording data rate of the recording medium to adjust the data rate of the moving image data.

Further features of the present invention will become apparent from the following description of exemplary embodiments with reference to the attached drawings.

DESCRIPTION OF THE EMBODIMENTS

A first exemplary embodiment of the present invention will be described with reference to FIG. 1.

Figure 1:
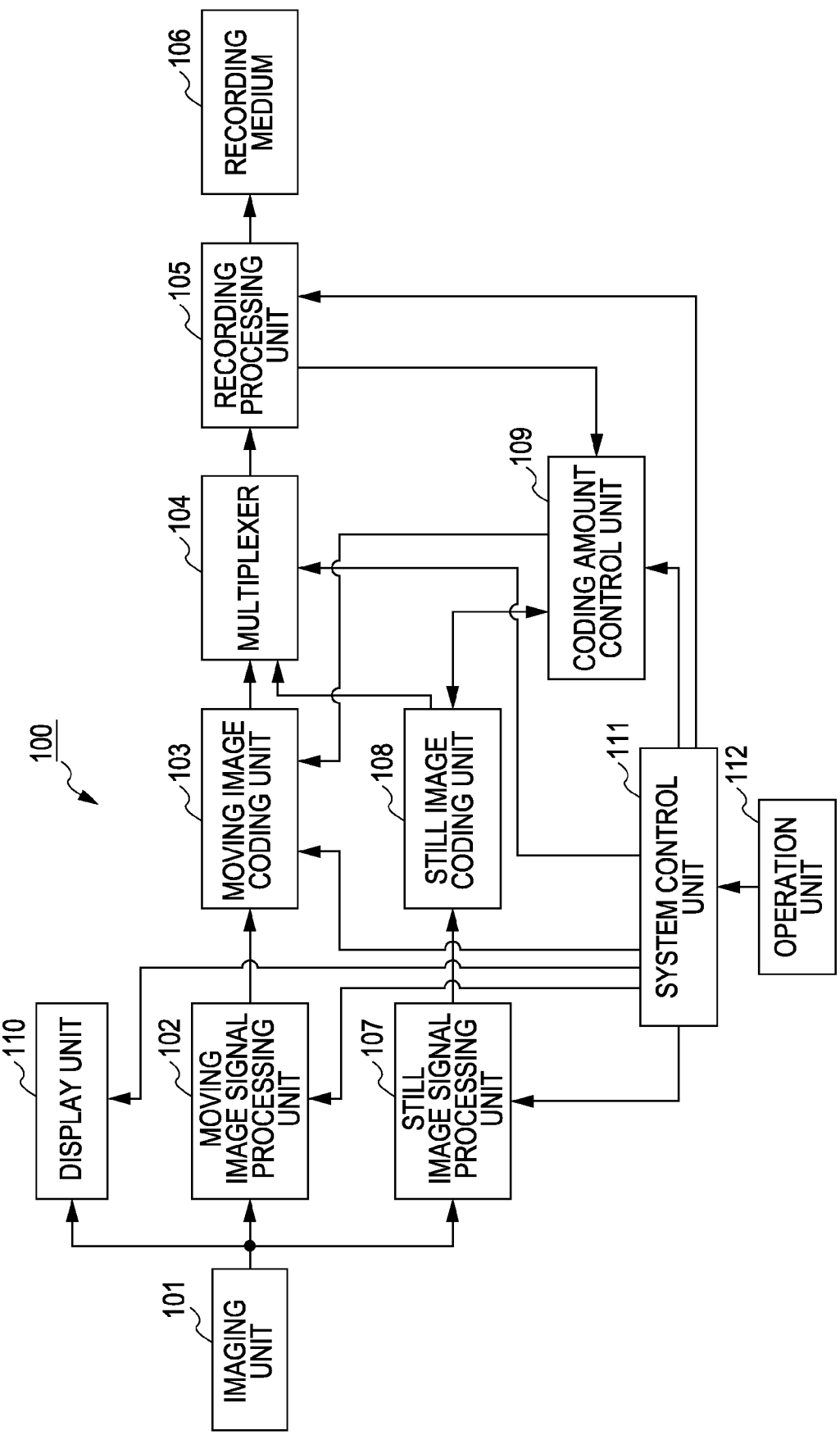
FIG. 1 is a block diagram showing a configuration of an imaging apparatus according to an exemplary embodiment of the present invention.

FIG. 1 is a block diagram showing an example of a configuration of an imaging apparatus 100 according to this exemplary embodiment.

Referring to FIG. 1, an imaging unit 101 includes an image pickup element, such as a charge coupled device (CCD), and an analog-to-digital (A/D) converter for converting an image signal into a digital signal. The imaging unit 101 captures an image of a subject and outputs moving image data. A moving image signal processing unit 102 performs processing described below on the moving image data output from the imaging unit 101. A moving image coding unit 103 receives the moving image data output from the moving image signal processing unit 102 and encodes the moving image data according to a given coding method to compress the information amount thereof.

A multiplexer 104 selects one of the moving image data supplied from the moving image coding unit 103 and still image data supplied from a still image coding unit 108 and outputs the selected one to a recording processing unit 105. The recording processing unit 105 performs processing on the moving image data or the still image data output from the multiplexer 104 to convert a format of the data into one suitable for recording, and records the data on a recording medium 106. The recording medium 106 is randomly accessed and may be, for example, a memory card, a hard disk drive (HDD), or an optical disc. In this exemplary embodiment, a recording data rate of the recording medium 106 is higher than a data rate of moving image data. Additionally, in this exemplary embodiment, a mass HDD is used as the recording medium 106. The HDD serving as the recording medium 106 is included in the imaging apparatus 100 and is not easily removed therefrom in this exemplary embodiment. However, the HDD may be easily exchanged using a mechanism, not shown.

A still image signal processing unit 107 selects, as a still image, one frame from moving image data output from the imaging unit 101 in response to a still image shooting instruction issued by a system control unit 111 to generate still image data. The still image signal processing unit 107 outputs the still image data of the selected frame to the still image coding unit 108 after performing processing on the still image data. The still image coding unit 108 encodes the still image data output from the still image signal processing unit 107 according to a given coding method to compress the information amount thereof.

A coding amount control unit 109 controls encoding processing performed by the moving image coding unit 103 and the still image coding unit 108 in a manner described below. A display unit 110 displays moving images based on moving image data output from the imaging unit 101, a still image corresponding to the still image shooting instruction, and various kinds of information.

The system control unit 111 controls each unit of the imaging apparatus 100. An operation unit 112 includes a power switch, a moving image recording switch for instructing start and termination of recording of moving images, and a still image recording switch for instructing shooting of a still image. As described later, the operation unit 112 also includes a menu switch for setting a moving image quality mode, the number of continuously shot still images, and a still image quality on a given menu screen and a joy stick.

In this exemplary embodiment, a user can select the image quality of moving images to be recorded from a plurality of image qualities.

For example, a standard image quality mode and a high image quality mode are prepared in this exemplary embodiment. The user selects one of the image quality modes. More specifically, the user can select the image quality mode of moving images to be recorded by operating the operation unit 112 when recording or image shooting is not performed. In addition, a data rate (an amount of data per unit time) of moving image data to be recorded in the high image quality mode differs from that of moving image data to be recorded in the standard image quality mode. More specifically, the moving image coding unit 103 sets a higher upper limit data rate value for moving image data recorded in the high image quality mode than in the standard image quality mode and encodes the moving image data according to the set data rate.

Figure 6:
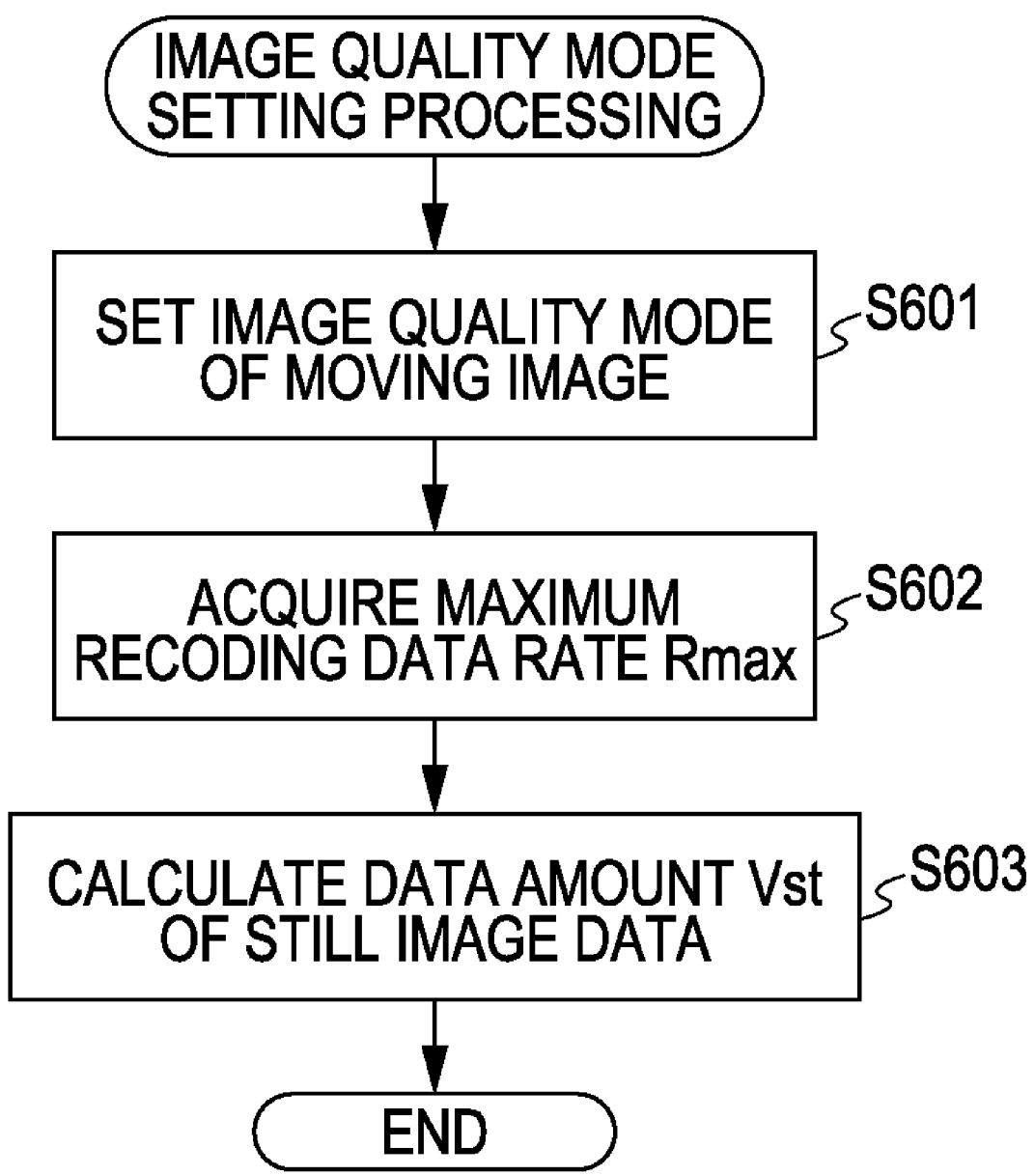
FIG. 6 is a flowchart showing processing for setting a moving image quality mode.

Processing for setting a data rate of moving image data and an amount of still image data to be recorded during shooting of moving images involving setting of the image quality mode by the imaging apparatus 100 will now be described. FIG. 6 is a flowchart showing a procedure executed at the time of image quality mode setting processing. The system control unit 111 controls each unit, thereby executing the processing shown in FIG. 6.

As described above, in response to user's selection of an image quality mode of moving image data, the system control unit 111 outputs information indicating the selected image quality mode to the coding amount control unit 109 (S601). The coding amount control unit 109 determines a data rate Rmv (bit/sec) of moving image data on the basis of the image quality mode information supplied from the system control unit 111 and outputs information regarding the data rate Rmv to the moving image coding unit 103. As described above, since the upper limit data rate value Rmv of moving image data in each image quality mode is predetermined, the system control unit 111 selects the data rate Rmv corresponding to the set image quality mode.

The coding amount control unit 109 then acquires information regarding a maximum data rate Rmax (bit/sec) set when the recording processing unit 105 records the data on the recording medium 106 (S602). In this exemplary embodiment, since an HDD included in the imaging apparatus 100 is used as the recording medium 106, the recording processing unit 105 previously stores the maximum data rate employable when recording the data on the HDD. When an exchangeable recording medium, such as a memory card, is used as the recording medium 106, the information regarding the maximum data rate Rmax can be acquired by reading out information regarding the maximum data rate from the recording medium.

The coding amount control unit 109 then calculates a data amount Vst for one frame of still image data to be recorded during shooting of moving image data on the basis of the data rate Rmv of the moving image data and the recording data rate Rmax of the recording medium in a manner described below (S603).

First, a data rate Rst (bit/sec), which is a difference between the data rate Rmax and the data rate Rmv, is calculated in the following manner.

$$Rst = Rmax - Rmv$$

The data rate Rst indicates an upper limit data rate value of data other than the moving image data when the data other than the moving image data is recorded during recoding of the moving image data. Here, it is assumed that still image data is recorded during recording of the moving image data.

The coding amount control unit 109 then calculates, on the basis of the data rate Rst, the data amount Vst (bit) for one frame of the still image data to be recorded during recording of the moving image data in the following manner.

$$Vst = Rst/N$$

Here, "N" represents the number of still images that can be shot by the imaging apparatus 100 in unit time, such as, for example, 1 second. In this exemplary embodiment, the value "N" is predetermined. However, the value "N" may be freely changed up to the upper limit value through an operation of the operation unit 112, for example. In this manner, each of N frames shot during unit time has the same still image data amount, which is equal to the data amount Vst.

After calculating the data amount Vst in this manner, the coding amount control unit 109 outputs information regarding the data amount Vst to the still image coding unit 108.

In this exemplary embodiment, in response to setting of an image quality mode of moving images, the data amount Vst of one still image to be recorded at the same time of recording of the moving image data is determined on the basis of the set image quality mode and a recording data rate of a recording medium.

Accordingly, when the standard image quality mode is set as the image quality mode of the moving image data, the data amount of still images to be recorded during shooting of moving images becomes larger than in the high image quality mode. That is, high-quality still images can be shot.

Figure 7:
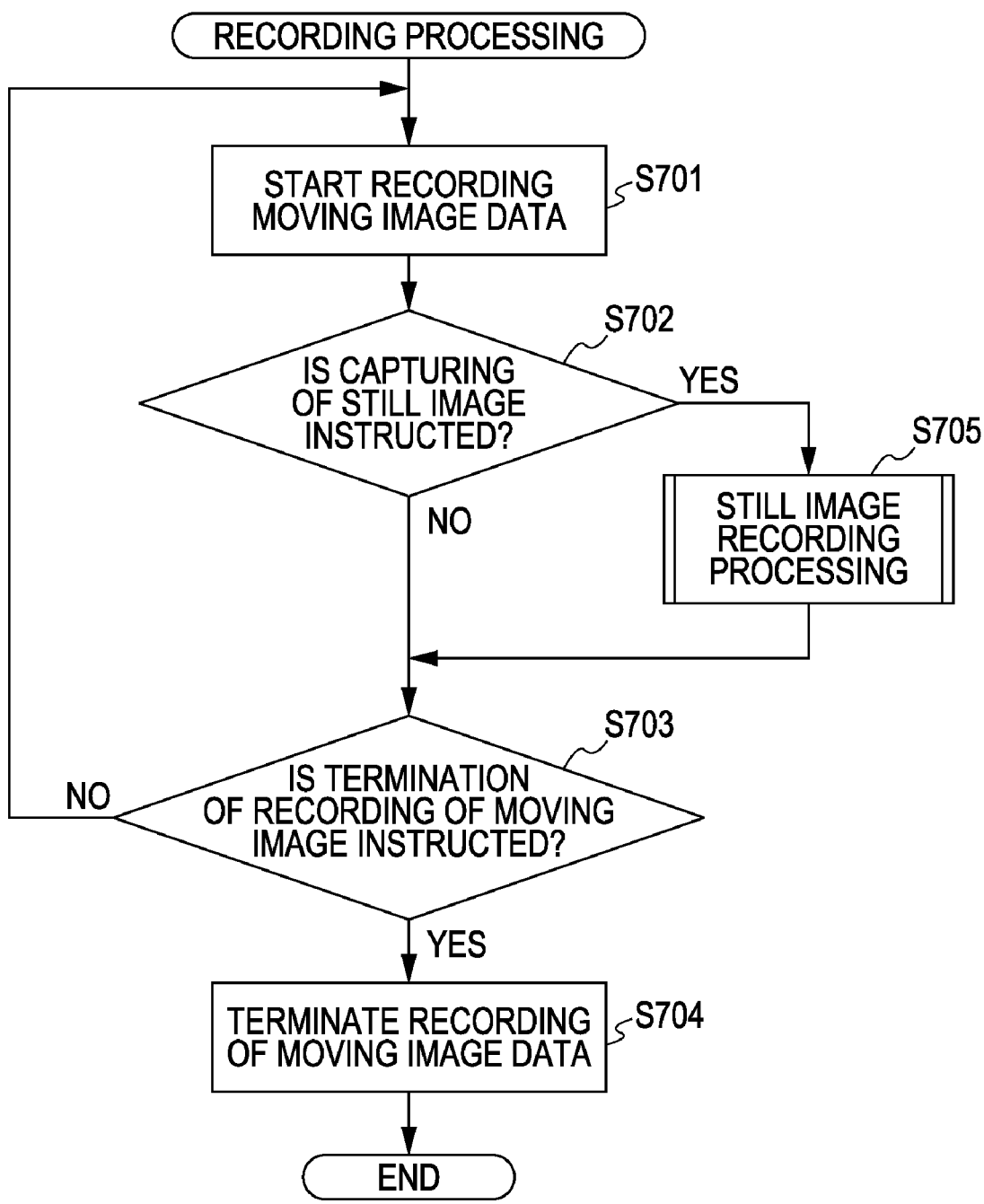
FIG. 7 is a flowchart showing recording processing.

A recording operation of the imaging apparatus 100 will now be described. FIG. 7 is a flowchart showing recording processing according to this exemplary embodiment. The system control unit 111 controls each unit to execute the processing shown in FIG. 7.

When starting of shooting of moving images is instructed through the operation unit 112, the system control unit 111 controls each block to start recording moving image data (S701). The imaging unit 101 outputs moving image data to the moving image signal processing unit 102. The moving image signal processing unit 102 performs processing, such as white balance adjustment, color processing, gamma processing, and contour correction, on the output moving image data and then outputs the processed moving image data to the moving image coding unit 103. The moving image coding unit 103 encodes the supplied moving image data according to a given coding method.

In this exemplary embodiment, the moving image coding unit 103 encodes the moving image data according to the MPEG standard. The MPEG standard is for encoding moving image data using intraframe coding (I-picture), forward-predictive interframe coding (P-picture), and bidirectionally-predictive interframe coding (B-picture).

Figure 2:
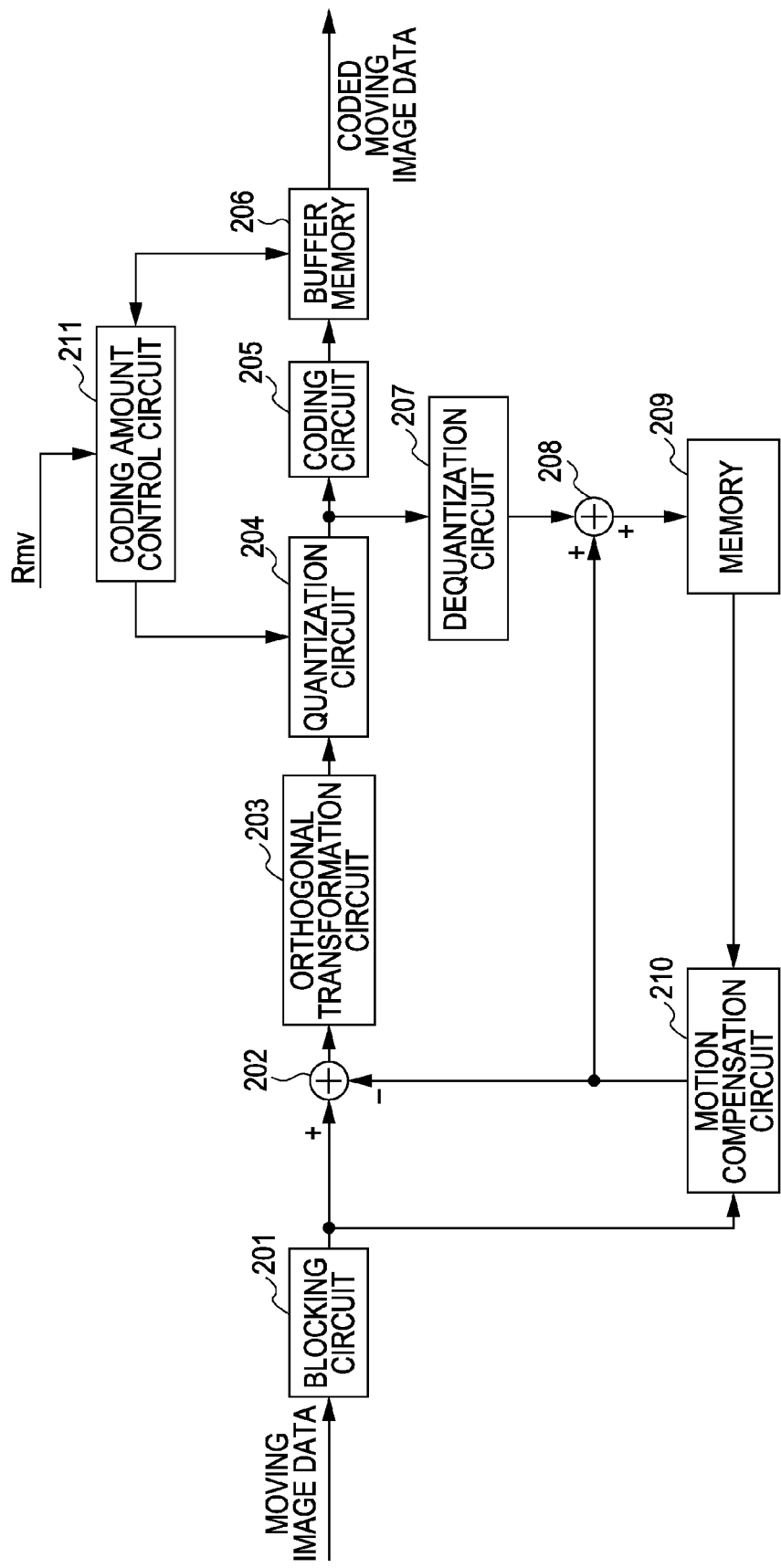
FIG. 2 is a block diagram showing a configuration of a moving image coding unit.

FIG. 2 is a block diagram showing a configuration of the moving image coding unit 103.

Referring to FIG. 2, a blocking circuit 201 divides supplied moving image data into blocks, each of which includes 8×8 pixels arranged in the horizontal and vertical directions. The blocking circuit 201 then supplies the divided moving image data to a subtractor 202 and a motion compensation circuit 210.

The motion compensation circuit 210 outputs reference data to the subtractor 202 in accordance with whether a frame to be encoded is an I-picture, a P-picture, or a B-picture. More specifically, when an I-picture is encoded (intraframe coding), the motion compensation circuit 210 outputs "0" to the subtractor 202. When a P-picture or a B-picture is encoded, the motion compensation circuit 210 compares data of a reference frame stored in a memory 209 with the data output from the blocking circuit 201. The motion compensation circuit 210 then reads out data of a block yielding the smallest difference from the memory 209 and outputs the data to the subtractor 202 as the reference data.

First, intraframe coding will be described.

Since "0" is input to the subtractor 202 as the reference data, the input image data is output to an orthogonal transformation circuit 203. The orthogonal transformation circuit 203 orthogonally transforms the moving image data supplied from the subtractor 202 for each block. The orthogonal transformation circuit 203 then outputs the moving image data to a quantization circuit 204.

The coding amount control unit 109 supplies the information regarding the data rate Rmv of the moving image data to a coding amount control circuit 211. The coding amount control circuit 211 sets, in accordance with the data rate Rmv, an initial quantization step value employed when the quantization circuit 204 quantizes the moving image data. The quantization circuit 204 quantizes, in accordance with the set quantization step, the orthogonally transformed data supplied from the orthogonal transformation circuit 203 for each block. The quantization circuit 204 then outputs the quantized data to a coding circuit 205 and a dequantization circuit 207.

The dequantization circuit 207 dequantizes and inversely orthogonally transforms the quantized data output from the quantization circuit 204 for each block. The dequantization circuit 207 then outputs the data to an adder 208. When intraframe coding is performed, "0" is supplied from the motion compensation circuit 210 as described above. Thus, the adder 208 outputs the data supplied from the dequantization circuit 207 to the memory 209. The supplied data of a frame is stored in the memory 209 as data of a reference frame.

The coding circuit 205 performs variable-length coding on the data supplied from the quantization circuit 204 using Huffman code and outputs the data to a buffer memory 206. The buffer memory 206 temporarily stores the coded data and outputs the stored data to the multiplexer 104 at a predetermined timing as coded moving image data.

The coding amount control circuit 211 also monitors an accumulation speed of data stored in the buffer memory 206. The coding amount control circuit 211 controls the quantization step of the quantization circuit 204 so that the data rate of the moving image data does not exceed the set value Rmv.

Interframe coding will now be described.

In this case, the motion compensation circuit 210 supplies the reference data to the subtractor 202. The subtractor 202 subtracts the reference data supplied from the motion compensation circuit 210 from the data supplied from the blocking circuit 201 to determine a prediction error. The subtractor 202 then supplies the prediction error to the orthogonal transformation circuit 203. The orthogonal transformation circuit 203 orthogonally transforms, for each block, the data supplied from the subtracter 202 and outputs the orthogonally transformed data to the quantization circuit 204.

The quantization circuit 204 quantizes the data supplied from the orthogonal transformation circuit 203 in accordance with the quantization step controlled by the coding amount control circuit 211 and supplies the quantized data to the coding circuit 205 and the dequantization circuit 207. The dequantization circuit 207 dequantizes and inversely orthogonally transforms the data supplied from the quantization circuit 204 and outputs the data to the adder 208.

When interframe coding is performed, the motion compensation circuit 210 supplies the reference data to the adder 208. The adder 208 adds the data supplied from the dequantization circuit 207 to the reference data supplied from the motion compensation circuit 210 and outputs the result to the memory 209. In this manner, the supplied data of a frame is stored in the memory 209 as data of a reference frame. Only data of P-pictures, among data on which the interframe predictive coding is performed, is stored in the memory 209 as data of a reference frame.

The coding circuit 205 performs variable-length coding on the data supplied from the quantization circuit 204 using the Huffman code and outputs the coded data to the buffer memory 206. As described above, the coding amount control circuit 211 controls the quantization step of the quantization circuit 204 so that the data rate of the moving image data does not exceed the value Rmv.

Referring back to FIG. 1, if shooting of a still image is not instructed, the multiplexer 104 selects the coded moving image data supplied from the moving image coding unit 103 and outputs the selected data to the recording processing unit 105. The recording processing unit 105 temporarily stores the moving image data output from the multiplexer 104 in an internal memory. If an amount of the moving image data stored in the memory reaches a predetermined value, the recording processing unit 105 reads out the moving image data from the memory and records the data on the recording medium 106 after attaching predetermined data to the read out data. If the amount of data stored in the memory is reduced to a predetermined value, the recording processing unit 105 stops recording the data on the recording medium 106. In this manner, moving image data is intermittently recorded on a recording medium in this exemplary embodiment.

Referring back to FIG. 7, the system control unit 111 determines whether shooting of a still image is instructed through the operation unit 112 during recording of moving image data (S702). If the shooting of a still image is not instructed (NO at S702), the system control unit 111 determines whether termination of recording of moving images is instructed (S703). If termination of recording of moving images is not instructed (NO at S703), the process returns to STEP S701. At STEP S701, the system control unit 111 continues to record the moving image data.

If termination of recording of moving images is instructed (YES at S703), the system control unit 111 terminates recording of the moving image data on the recording medium 106 (S704). In this exemplary embodiment, the moving image data is recorded as a file. More specifically, moving image data of one scene shot between start and termination of recording is managed as one file.

Processing performed when shooting of a still image is instructed during shooting of moving images at S702 will be described. If shooting of a still image is instructed during recording of moving images (YES at S702), the process proceeds to STEP S705. At STEP S705, the system control unit 111 executes still image recording processing.

Figure 8:
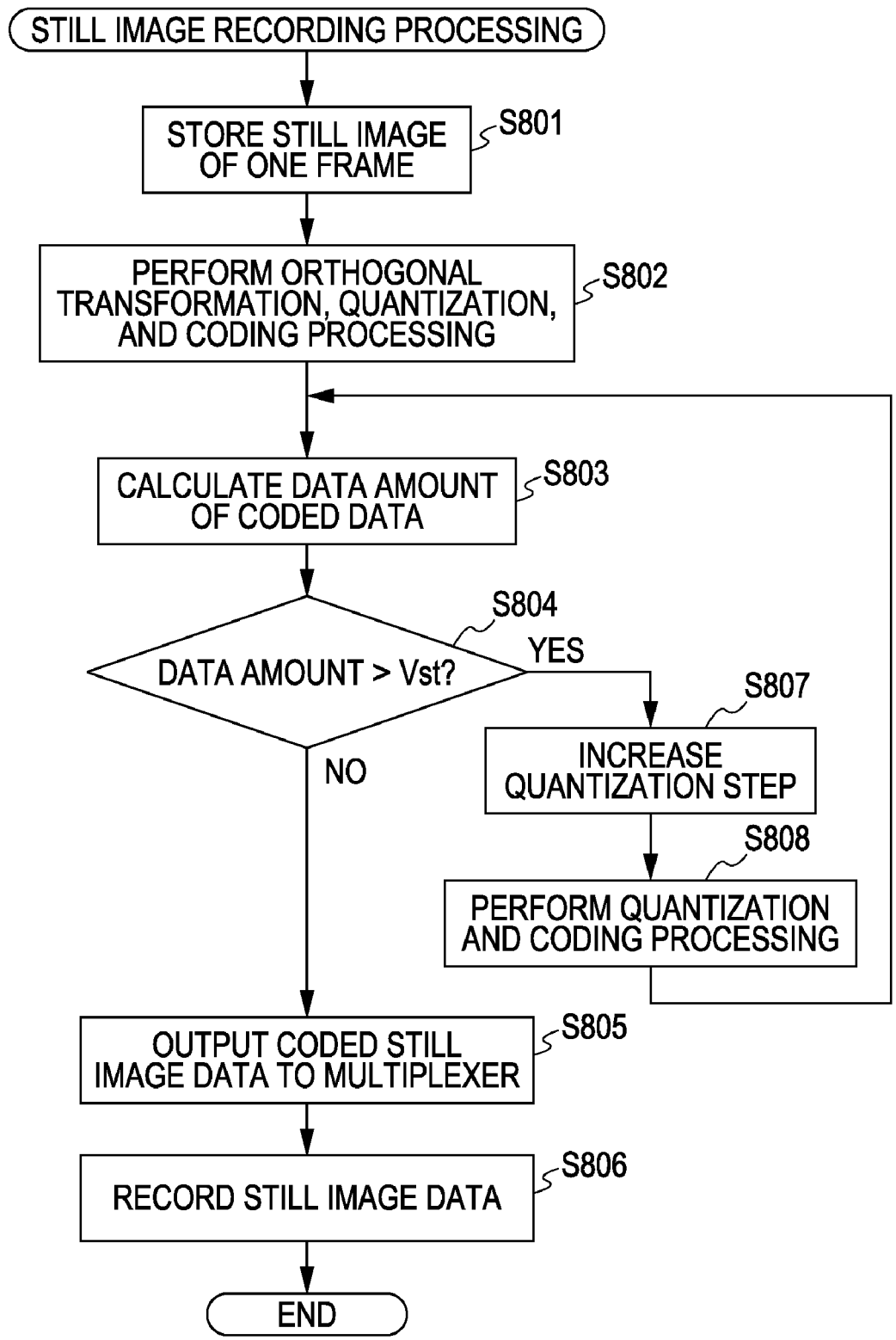
FIG. 8 is a flowchart showing still image recording processing.

FIG. 8 is a flowchart showing the still image recording processing performed at STEP S705.

In response to a still image shooting instruction, the system control unit 111 instructs the still image signal processing unit 107 to shoot a still image. In response to the still image shooting instruction, the still image signal processing unit 107 selects one frame, from the moving image data output from the imaging unit 101, at a timing corresponding to the still image shooting instruction and temporarily stores the data of the selected frame in an internal memory (S801). The still image signal processing unit 107 then performs processing, such as white balance adjustment, color processing, gamma processing, and contour correction, on the image signal output from the imaging unit 101 and outputs the processed data to the still image coding unit 108.

The still image coding unit 108 encodes the supplied still image data in accordance with a given coding method. In this exemplary embodiment, the still image coding unit 108 encodes still image data in accordance with the JPEG standard.

Figure 3:
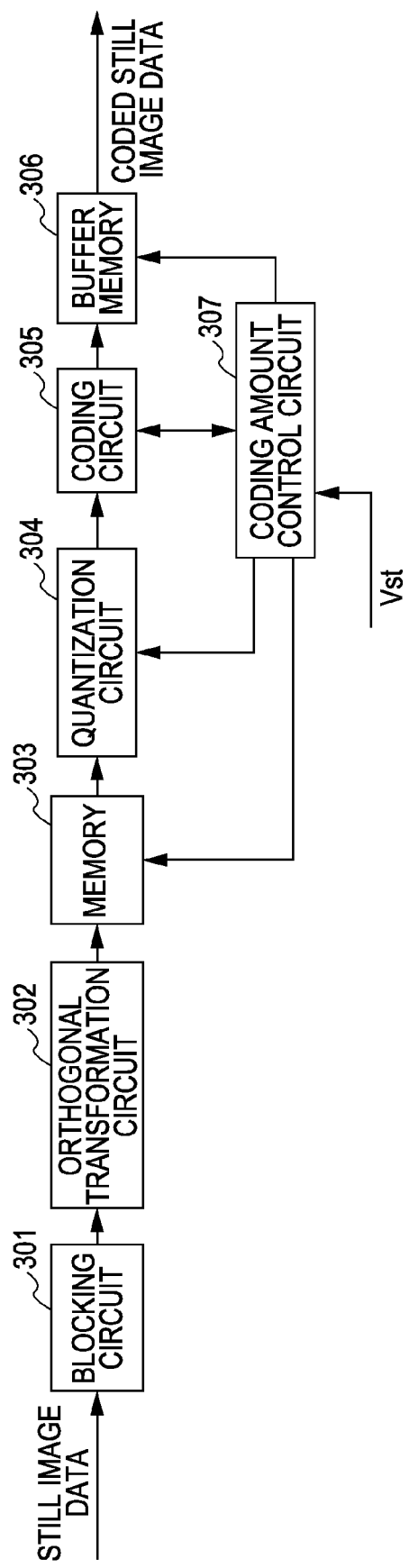
FIG. 3 is a block diagram showing a configuration of a still image coding unit.

FIG. 3 is a block diagram showing a configuration of the still image coding unit 108.

Referring to FIG. 3, a blocking circuit 301 divides the supplied still image data into blocks, each of which includes 8×8 pixels arranged in the horizontal and vertical directions. The blocking circuit 301 then outputs the divided data to an orthogonal transformation circuit 302. The orthogonal transformation circuit 302 orthogonally transforms, for each block, the still image data and stores the orthogonally transformed still image data in a memory 303.

A coding amount control circuit 307 is supplied with the data amount Vst for one still image from the coding amount control unit 109. The coding amount control circuit 307 sets an initial quantization step value in a quantization circuit 304 in consideration for the size of the still image (number of pixels) and a bit width of one pixel.

The quantization circuit 304 reads out the orthogonally transformed still image data from the memory 303. In accordance with the instruction of the coding amount control circuit 307, the quantization circuit 304 quantizes, for each block, the orthogonally transformed still image data and supplies the quantized data to a coding circuit 305. The coding circuit 305 performs variable-length coding on the quantized still image data for each block and stores the coded still image data in a buffer memory 306. The coding circuit 305 also outputs information regarding the code length to the coding amount control circuit 307 (S802).

In accordance with the information output from the coding circuit 305, the coding amount control circuit 307 calculates a data amount of one still image (S803). The coding amount control circuit 307 then determines whether the calculated data amount exceeds the set data amount Vst (S804).

If the calculated data mount exceeds the set data amount Vst (YES at S804), the coding amount control circuit 307 increases the quantization step of the quantization circuit 304 (S807). The orthogonally transformed still image data read out from the memory 303 is then quantized and encoded (S808). The process then returns to STEP S803. At STEP S803, the coding amount control unit 307 calculates the data amount again. In this manner, encoding is performed so that an amount of still image data does not exceed the set data amount Vst.

If the amount of the still image does not exceed the data amount Vst (NO at S804), the coding amount control circuit 307 reads out the coded still image data from the buffer memory 306 and outputs the read out still image data to the multiplexer 104 (S805).

If the coded still image data is output from the still image coding unit 108 in response to the still image shooting instruction supplied from the system control unit 111, the multiplexer 104 selects and outputs this still image data to the recording processing unit 105.

The recording processing unit 105 temporarily stores the still image data output from the multiplexer 104 in a memory. The recording processing unit 105 then reads out the still image data from the memory at a predetermined timing when the moving image data is not recorded and records the still image data on the recording medium 106 (S806). In this exemplary embodiment, a still image data of one frame that is recorded in response to one still image shooting instruction is managed as one file.

As described above, according to this exemplary embodiment, a data amount of a still image to be recorded during shooting of moving images is determined on the basis of a recording data rate of the recording medium 106 and a data rate of moving image data to be recorded.

Accordingly, still image data can be recorded while moving image data is being recorded and the minimum still-image shooting interval can be guaranteed.

Thus, even if shooting of a still image is instructed while shooting moving images of one scene, a buffer memory for storing still image data until shooting of moving images is terminated can be omitted. In addition, a restriction on the number of still images that can be shot during shooting of moving images can be removed.

Additionally, since still image data is not recorded after termination of shooting of moving images, a user can perform a following operation immediately after termination of shooting.

Furthermore, since a data rate of moving image data is determined in accordance with an image quality mode set by a user, variance in the coding amount of moving image data of one scene can be suppressed and a preferable image quality can be provided.

In this exemplary embodiment, still image data is encoded so that an amount of the still image data does not exceed the value Vst when the still image data is recorded during recording of moving image data. On the other hand, in this exemplary embodiment, still image data can be recorded when moving image data is not recorded.

More specifically, if a user operates the operation unit 112 to issue a still image shooting instruction when recording is not performed, the system control unit 111 controls the still image signal processing unit 107 and the still image coding unit 108 to generate and encode still image data of one frame. The recording processing unit 105 then records this still image data on the recording medium 106.

At this time, an amount of still image data is set regardless of an image quality (data rate) of moving image data. More specifically, the amount of the still image data may be set to a predetermined value. Alternatively, a user may set an image quality mode of still image data separately from the image quality mode of moving image data when only still images are recorded. In this manner, the system control unit 111 adjusts the amount of still image data in accordance with the image quality mode of the still image data when only still images are recorded.

Although two image quality modes of moving image data are prepared in this exemplary embodiment, the image quality modes are not limited to these examples. Three or more image quality modes may be prepared. A user may select the image quality mode.

A second exemplary embodiment of the present invention will now be described. In this exemplary embodiment, the still image coding unit 108 includes a plurality of coding amount calculation circuits.

Figure 4:
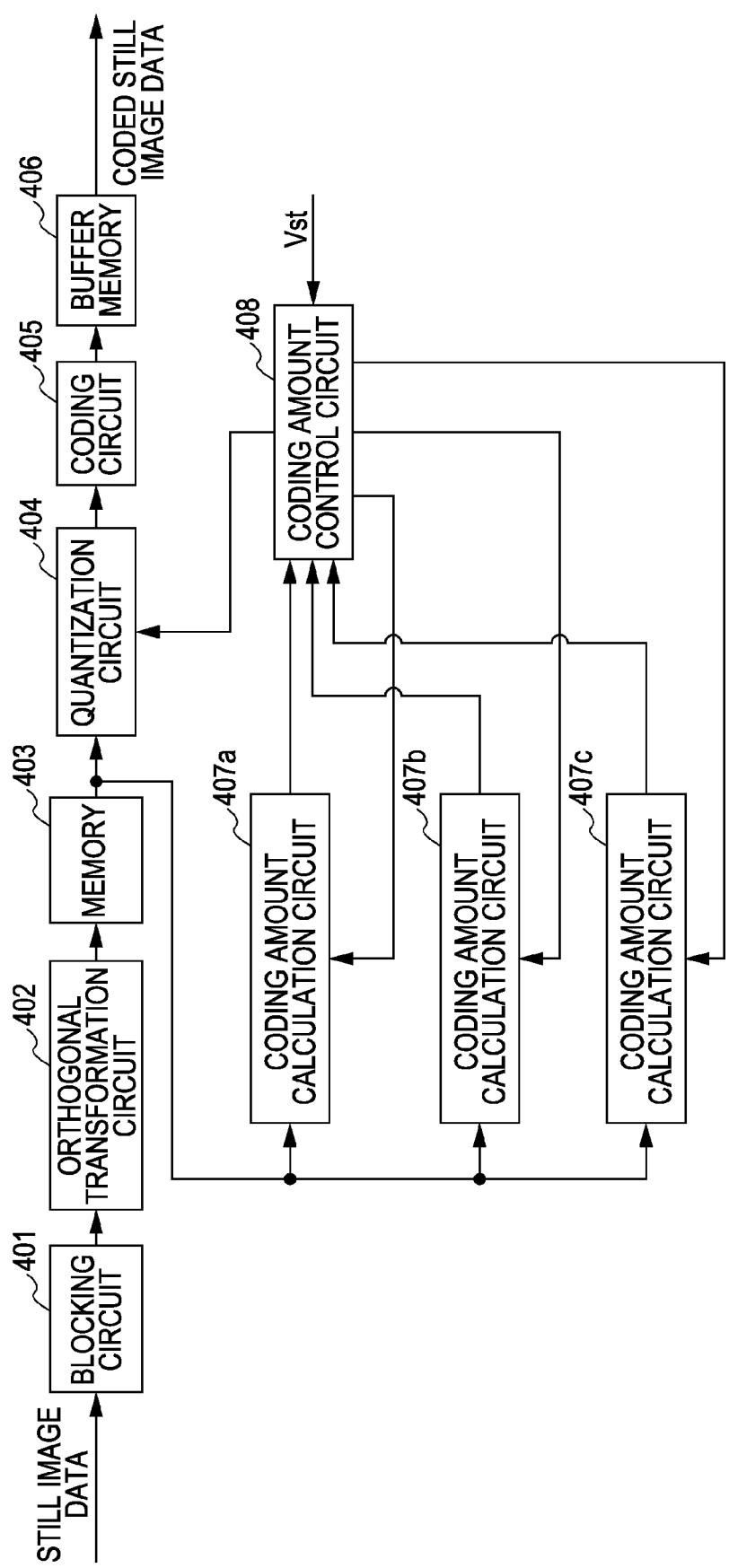
FIG. 4 is a block diagram showing a configuration of a still image coding unit.

FIG. 4 is a block diagram showing a configuration of the still image coding unit 108 according to this exemplary embodiment. The imaging apparatus 100 and the moving image coding unit 103 have configurations similar to those described in the first exemplary embodiment. Differences from the first exemplary embodiment will be described below.

Referring to FIG. 4, since a blocking circuit 401 and an orthogonal transformation circuit 402 have the same functions as the blocking circuit 301 and the orthogonal transformation circuit 302, respectively, detailed descriptions thereof are omitted.

Each of coding amount calculation circuits 407a-407c calculates a coding amount of orthogonally transformed still image data stored in a memory 403 by quantizing orthogonally transformed still image data using different quantization steps. Each of the coding amount calculation circuits 407a-407c reads out orthogonally transformed still image data from the memory 403 and quantizes the read out still image data for each block. In this exemplary embodiment, a coding amount control circuit 408 sets different quantization steps in the coding amount calculation circuits 407a-407c on the basis of the value Vst.

Each of the coding amount calculation circuits 407a-407c performs variable-length coding on the quantized data and calculates a coding amount of one still image. Each of the coding amount calculation circuits 407a-407c outputs information of the calculated coding amount of one still image to the coding amount control circuit 408.

The coding amount control circuit 408 selects, from the pieces of the still image data for each of which the coding amount is calculated by the coding amount calculation circuits 407a-407c, one piece having the data amount not larger than the value Vst but having the largest coding amount. The coding amount control circuit 408 then sets the quantization step employed when the selected still image data is encoded in a quantization circuit 404. The quantization circuit 404 quantizes the orthogonally transformed still image data read out from the memory 403 and outputs the quantized data to a coding circuit 405.

The coding circuit 405 performs variable-length coding on the supplied data and outputs the coded data to a buffer memory 406 to store the coded data. The data stored in the buffer memory 406 is output the multiplexer 104.

As described above, according to this exemplary embodiment, since a coding amount of still image data is estimated in parallel, time for coding the still image data can be reduced. Accordingly, a still-image shooting interval during shooting of moving images can be shortened.

Although three coding amount calculation circuits 407a-407c are included and each of the coding amount calculation circuits quantizes still image data in parallel in FIG. 4, two, or four or more coding amount calculation circuits may be included.

A third exemplary embodiment of the present invention will now be described. In this exemplary embodiment, a still image coding unit 108 having a configuration different from the first and second exemplary embodiments will be described.

Figure 5:
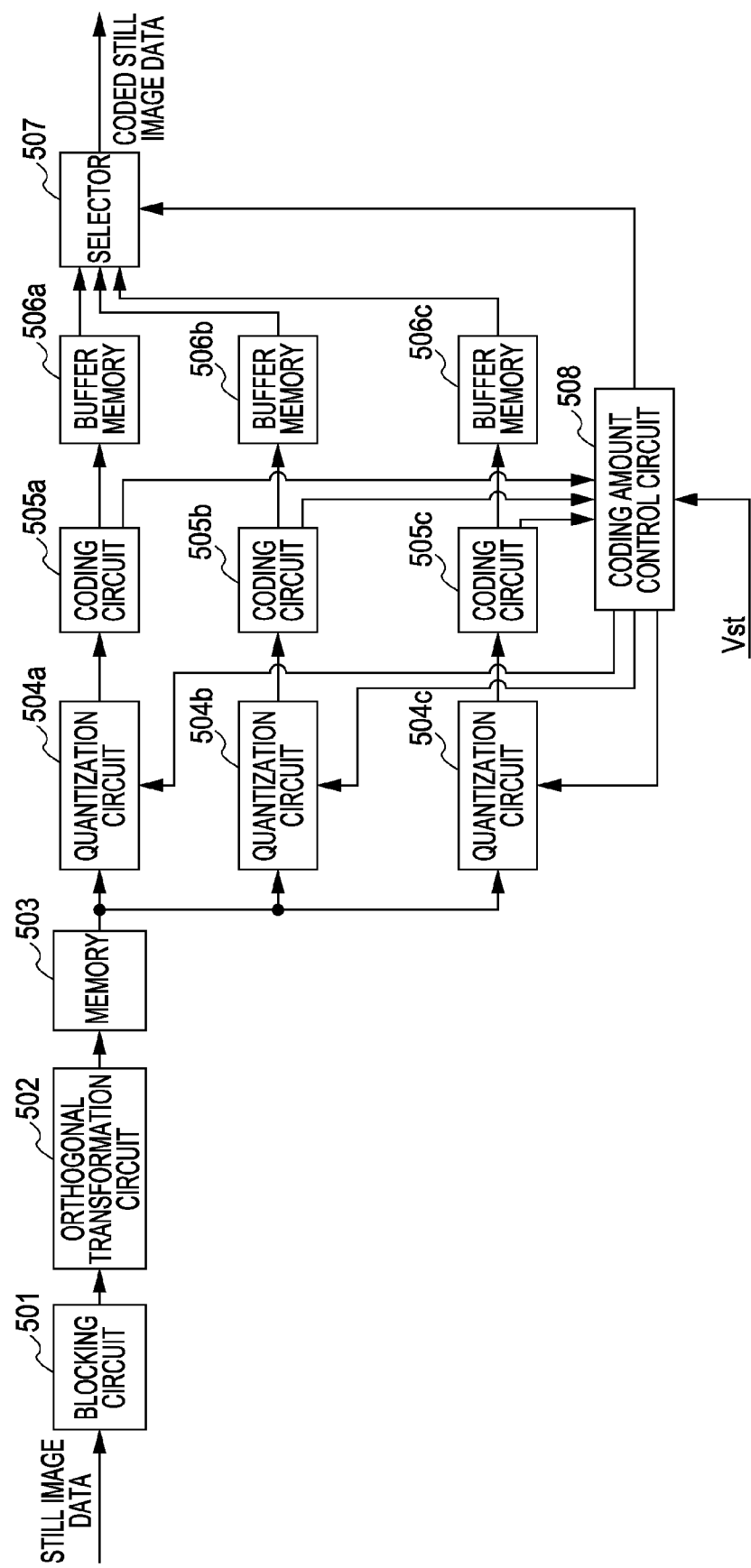
FIG. 5 is a block diagram showing a configuration of a still image coding unit.

FIG. 5 is a block diagram showing a configuration of the still image coding unit 108 according to this exemplary embodiment. The imaging apparatus 100 and the moving image coding unit 103 have configurations similar to those described in the first exemplary embodiment. Differences from the first exemplary embodiment will be described below.

Referring to FIG. 5, since a blocking circuit 501 and an orthogonal transformation circuit 502 have the same functions as the blocking circuit 301 and the orthogonal transformation circuit 302, respectively, detailed descriptions thereof are omitted.

Each of quantization circuits 504a-504c reads out orthogonally transformed still image data from a memory 503 and quantizes the read out still image data for each block. In this exemplary embodiment, a coding amount control circuit 508 sets different quantization steps in the quantization circuits 504a-504c on the basis of the value Vst.

Each of coding circuits 505a-505c performs a variable-length coding on the supplied data and stores the encoded data in buffer memories 506a-506c, respectively. Each of the coding circuits 505a-505c also outputs information regarding a code length to the coding amount control circuit 508. The coding amount control circuit 508 calculates, for each of the coding circuits 505a-505c, a data amount of one still image.

The coding amount control circuit 508 selects, from pieces of still image data encoded by the coding circuits 505a-505c, a piece having a data amount not exceeding the value Vst but having the largest coding amount. The coding amount control circuit 508 controls a selector 507 to read out still image data from one of the buffer memories 506a-506c that stores the selected still image data and to output the read out data to the multiplexer 104.

According to this exemplary embodiment, since the coding amount of still image data is estimated in parallel and coded data is stored in buffers. Thus, time for coding still image data can be further reduced and a still-image shooting interval during shooting of moving images can be shortened.

Although three quantization circuits 504a-504c are shown in FIG. 5 and still image data is quantized by each of the quantization circuits 504a-504c, two, or four or more quantization circuits may be included.

A fourth exemplary embodiment of the present invention will now be described. In this exemplary embodiment, a user can freely set an image quality (data amount) of still images to be recorded during shooting of moving images.

Figure 9:
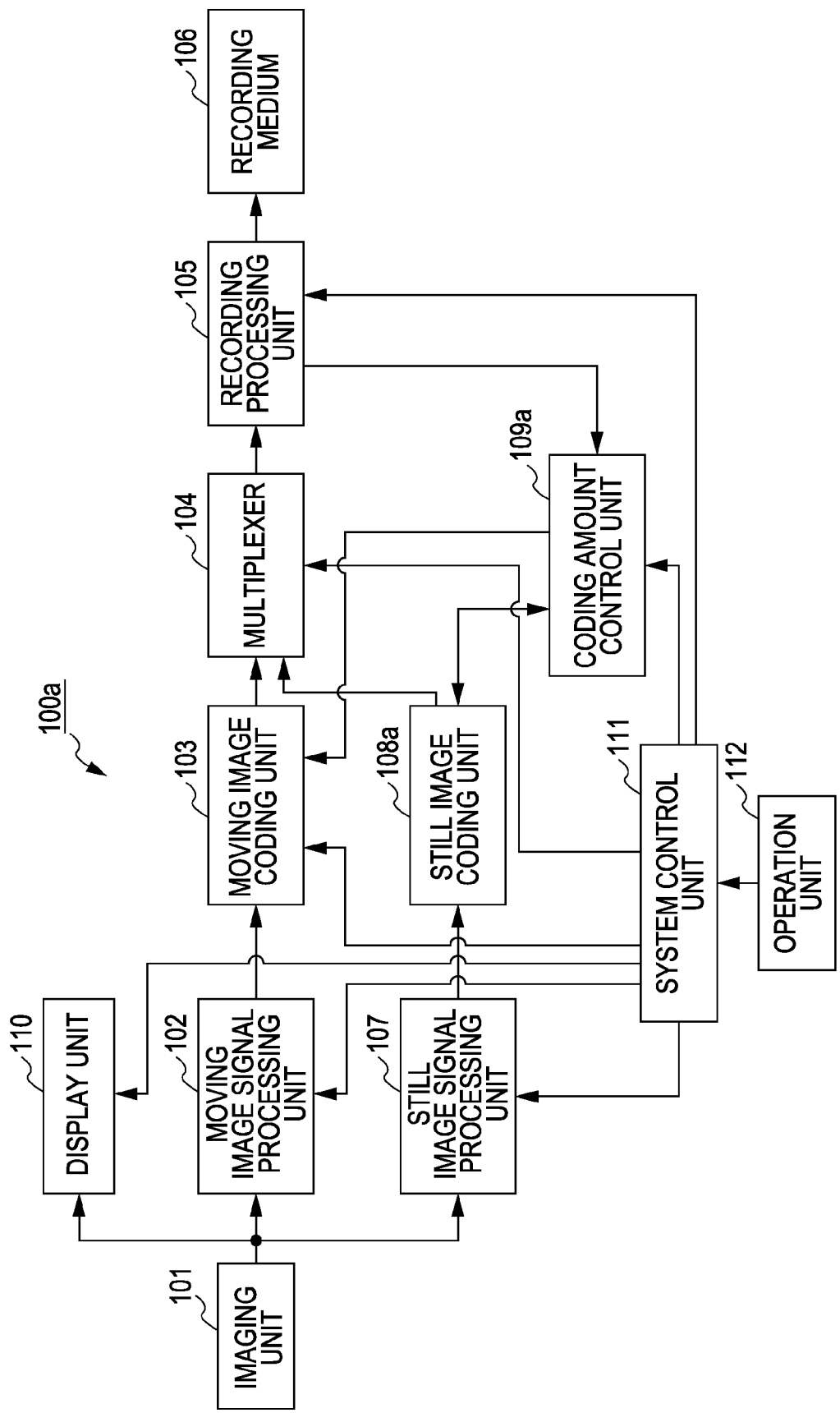
FIG. 9 is a block diagram showing a configuration of an imaging apparatus according to an exemplary embodiment of the present invention.

FIG. 9 is a block diagram showing an example of a configuration of an imaging apparatus 100a according to this exemplary embodiment. The imaging apparatus 100a shown in FIG. 9 has functional blocks similar to those included in the imaging apparatus 100 shown in FIG. 1. The imaging apparatus 100a has moving image and still image shooting functions. Differences from the first exemplary embodiment will be described below.

In this exemplary embodiment, a user can set an image quality of still image data to be recorded during shooting of moving images by operating an operation unit 112.

For example, two image quality modes, namely, a standard image quality mode and a high image quality mode, are prepared as image quality modes of still images in this exemplary embodiment. A user select one of the image quality modes. The user can selects the image quality mode of still images by operating the operation unit 112 when a shooting operation is not performed.

A system control unit 111 outputs information regarding the image quality mode selected by the user to a coding amount control unit 109a. The coding amount control unit 109a determines a quantization step of still image data to be recorded during shooting of moving images on the basis of the information regarding the image quality mode of still images supplied from the system control unit 111. The coding amount control unit 109a then outputs information regarding the quantization step to a still image coding unit 108a.

As in the first exemplary embodiment, the coding amount control unit 109a also determines a data rate Rmv of moving image data in accordance with an image quality mode of moving image data selected by the user. The coding amount control unit 109a outputs information on the data rate Rmv to a moving image coding unit 103. Furthermore, the coding amount control unit 109a acquires information regarding a recording data rate Rmax of a recording medium 106.

Figure 10:
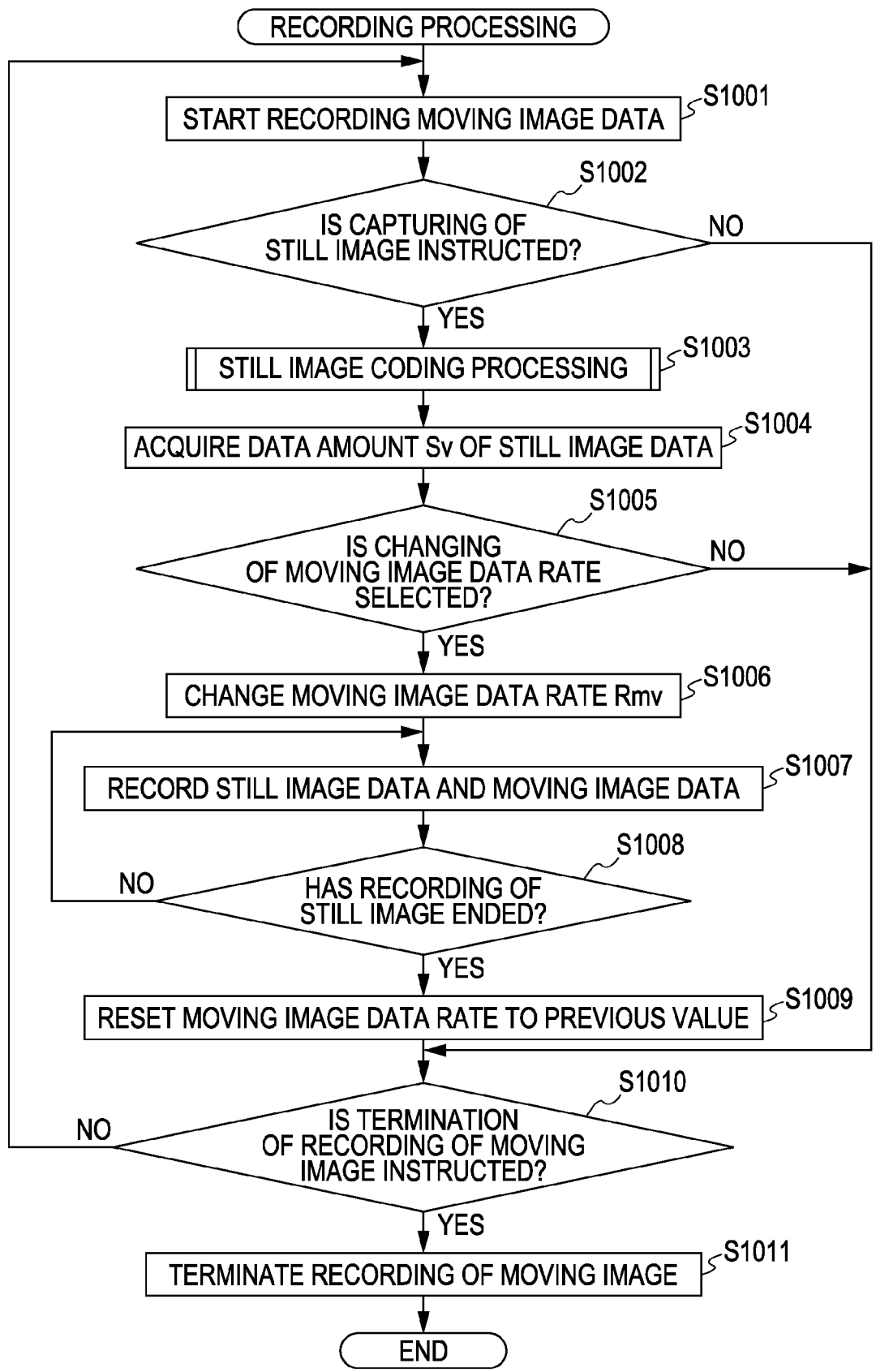
FIG. 10 is a flowchart showing recording processing.

A recording operation of the imaging apparatus 100a will now be described. FIG. 10 is a flowchart showing recording processing according to this exemplary embodiment. The system control unit 111 controls each unit to execute the processing shown in FIG. 10.

If starting of shooting of moving images is instructed through the operation unit 112, the system control unit 111 controls each unit to start coding and recording of moving image data (S1001). At this time, as in the first exemplary embodiment, the coding amount control unit 109a outputs the information regarding the data rate Rmv of the moving image data to the moving image coding unit 103. The moving image coding unit 103 adjusts the coding amount so that a data rate of the moving image data to be encoded does not exceed the data rate Rmv.

The system control unit 111 determines whether shooting of a still image is instructed through the operation unit 112 during recording of the moving image data (S1002). If shooting of a still image is not instructed (NO at S1002), the system control unit 111 determines whether termination of recording of moving images is instructed (S1010). If termination of recording is not instructed (NO at S1010), the process returns to S1001. Recording of the moving image data is continued. If termination of recording of moving images is instructed (YES at S1010), the system control unit 111 terminates recording of the moving image data on the recording medium 106 (S1011).

Processing performed at STEP S1002 when shooting of a still image is instructed during shooting of moving images will now be described. If shooting of a still image is instructed during recording of moving images (YES at S1002), the process proceeds to STEP S1003. At STEP S1003, still image coding processing is executed.

Figure 11:
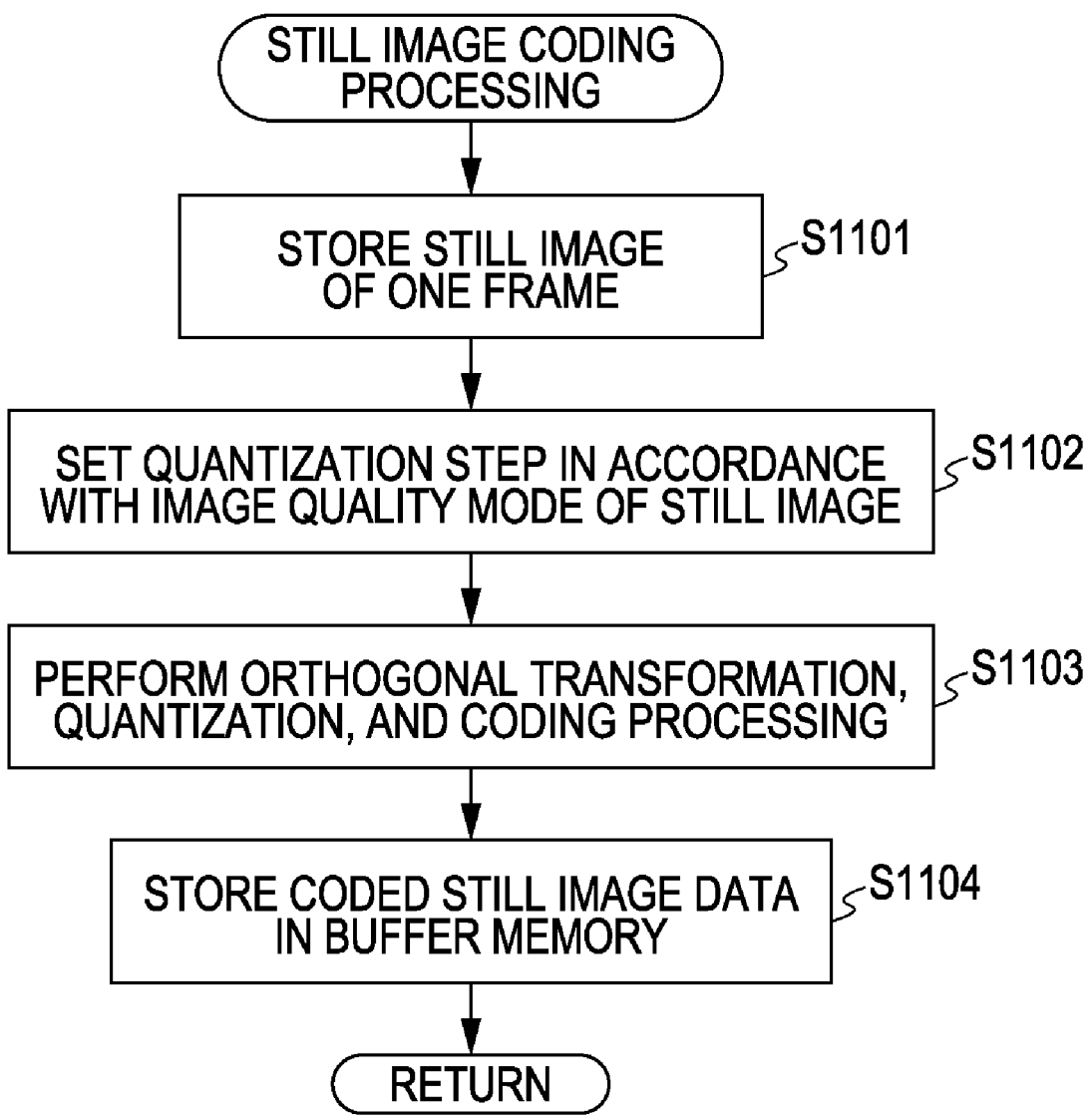
FIG. 11 is a flowchart showing still image coding processing.
Figure 13:
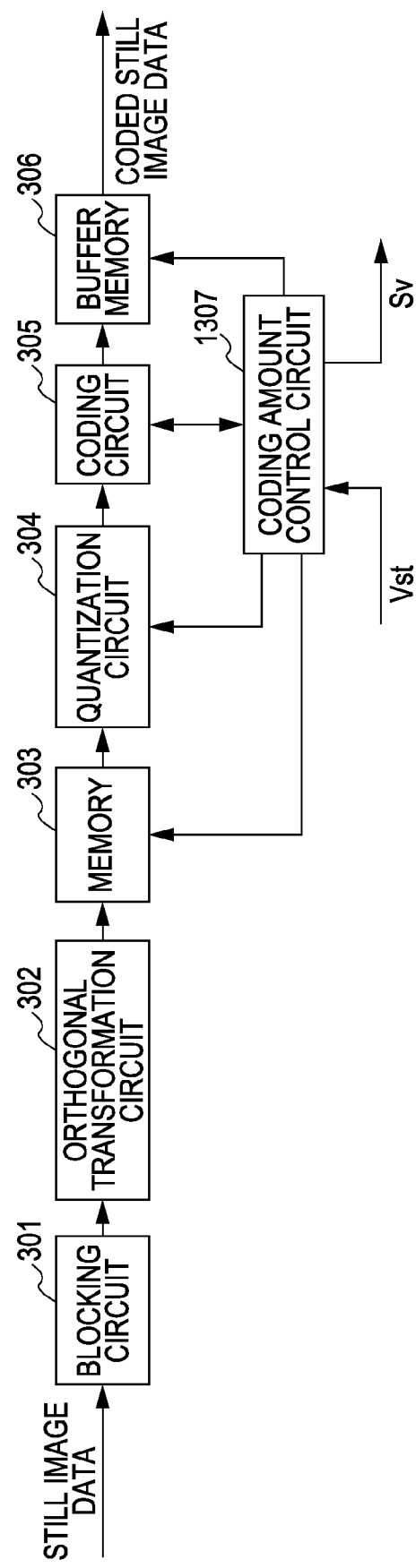
FIG. 13 is a block diagram showing a configuration of a still image coding unit.

FIG. 13 is a diagram showing a configuration of the still image coding unit 108a according to this exemplary embodiment. In FIG. 13, like or similar references designate configurations commonly shown in FIG. 3 and a detailed description thereof is omitted. FIG. 11 is a flowchart showing still image recording processing performed at STEP S1003.

Referring to FIG. 11, the system control unit 111 instructs, in response to the still image shooting instruction, a still image signal processing unit 107 to shoot a still image. In response to the still image shooting instruction, the still image signal processing unit 107 selects, from moving image data output from an imaging unit 101, one frame corresponding to a timing of the still image shooting instruction and temporarily stores data of the selected frame in an internal memory (S1101). The still image signal processing unit 107 then performs processing, such as white balance adjustment, color processing, gamma processing, and contour correction, on the still image data of one frame stored in the memory and outputs the processed still image data to the still image coding unit 108a.

A coding amount control circuit 1307 of the still image coding unit 108a sets a quantization step of a quantization circuit 304 on the basis of the information regarding the image quality mode of still images supplied from the coding amount control unit 109a (S1102). The still image coding unit 108a encodes the still image data in accordance with the set quantization step (S1103) and stores the encoded still image data in a buffer memory 306 (S1104).

In this exemplary embodiment, the coding amount control circuit 1307 also sequentially acquires coded results of the still image data from a coding circuit 305 and calculates an amount Sv of still image data of one frame. The coding amount control circuit 1307 outputs information regarding the data amount Sv (bit) to the coding amount control unit 109a.

After coding of the still image data is finished, the process proceeds to STEP S1004 shown in FIG. 10. At STEP S1004, the coding amount control unit 109a acquires information regarding the amount Sv of the still image data from the still image coding unit 108a. The coding amount control unit 109a determines, in accordance with the data amount Sv, whether to change the data rate Rmv of moving image data (S1005).

For example, when a still image shooting interval N is set equal to 1, the coding amount control unit 109a determines whether the following expression is satisfied.

$$R\mathrm{max}-Rmv \leqq Sv$$

More specifically, the coding amount control unit 109a determines whether a value obtained by subtracting the data rate of moving image data from the data rate of the recording medium is larger than the data amount Sv of the still image data. If the expression is satisfied, the coding amount control unit 109a determines that recording of still image data can be realized during recording of moving image data without changing the data rate Rmv of the moving image data. The process then proceeds to STEP S1010.

If the data amount Sv of the still image data satisfies the following expression $$R\mathrm{max}-Rmv \leqq Sv$$

at STEP S1005, the coding amount control unit 109a determines that the data rate of the moving image data has to be lowered to record still image data during recording of moving image data. The process then proceeds to STEP S1006. At STEP S1006, the coding amount control unit 109a calculates a data rate Rmv' of moving image data in the following manner.

$$Rmv'=Rmv \times \alpha \text{ (where, } 0<\alpha<1)$$

The coding amount control unit 109a then outputs information regarding the data rate Rmv' to the moving image coding unit 103 to change the data rate of the moving image data to the value Rmv'. If the value α is extremely small, the image quality of the moving image significantly drops. Thus, the value α is desirably set to approximately 0.7-0.9.

The moving image coding unit 103 encodes moving image data so that the data rate of the encoded moving image data does not exceed the newly set data rate Rmv'. A recording processing unit 105 reads out the still image data stored in the buffer memory 306 through a multiplexer 104 and records this still image data and the encoded moving image data on the recording medium 106 (S1007).

After the start of recording of the still image data, the system control unit 111 waits for termination of recording of the still image data (S1008). After the termination of recording of the still image, the system control unit 111 sets the data rate of the moving image back to the previous data rate Rmv and outputs information regarding the data rate Rmv to the moving image coding unit 103. The moving image coding unit 103 then encodes the moving image data so that the data rate of the encoded moving image data does not exceed the data rate Rmv. The encoded moving image data is then recorded on the recording medium 106 (S1009).

Time T for recording still image data of a data amount Sv is represented by the following equation.

$$T = Sv/(R\text{max} - Rmv \times \alpha) \text{ (seconds)}$$

As described above, according to this exemplary embodiment, a user previously sets an image quality of still image data to be recorded during shooting of moving images. In response to a still image shooting instruction issued during shooting of moving images, a data rate of moving image data is changed on the basis of an amount of encoded still image data before the moving image data and the still image data are recorded.

Accordingly, still images having an image quality set by the user can be recorded, in response to the still image shooting instruction issued during shooting of moving images, while recording moving images.

Even if a still image shooting instruction is issued during shooting of moving images of one scene, a buffer memory for storing still image data until termination of shooting of moving images can be omitted. In addition, a restriction on the number of still images that can be shot during shooting of moving images can be removed.

Since still image data is not recorded after termination of shooting of moving images, a user can perform a following operation immediately after the termination of shooting.

If a user does not want to lower a data rate of a moving image when a still images is shot during shooting of moving images, the user may set a lower image quality for the still images.

Although two modes are prepared as image quality modes of still images to be recorded during shooting of moving images in this exemplary embodiment, the number of modes is not limited to this particular example. Three or more image quality modes may be prepared. A user may select one of the modes.

A fifth exemplary embodiment of the present invention will now be described. In the first to third exemplary embodiments, an amount of still image data is set without changing a data rate of moving image data when still images are shot during shooting of moving images. On the other hand, in the fourth exemplary embodiment, the data rate of the moving image data is set without changing a set image quality (data amount) of still image data when still images are shot during shooting of moving images.

This exemplary embodiment prepares a first mode for setting an amount of still image data without changing a data rate of moving image data when still images are shot during shooting of moving images and a second mode for setting the data rate of the moving image data without changing an image quality of the still images.

A user can select and set either the first mode or the second mode.

The imaging apparatus according to this exemplary embodiment has a configuration similar to that of the imaging apparatus shown in FIG. 1 or 9. The imaging apparatus also employs the similar basic recording processing. More specifically, a user sets an image quality mode of moving image data to be recorded through the operation unit 112 and sets an image quality mode of still image data to be recorded during shooting of moving images. In addition, the user selects one of the first mode (moving image preferential mode) and the second mode (still image preferential mode) by operating the operation unit 112.

A system control unit 111 controls, in response to a still image shooting instruction issued during shooting of moving images, each unit in accordance with the mode set by the user.

Figure 12:
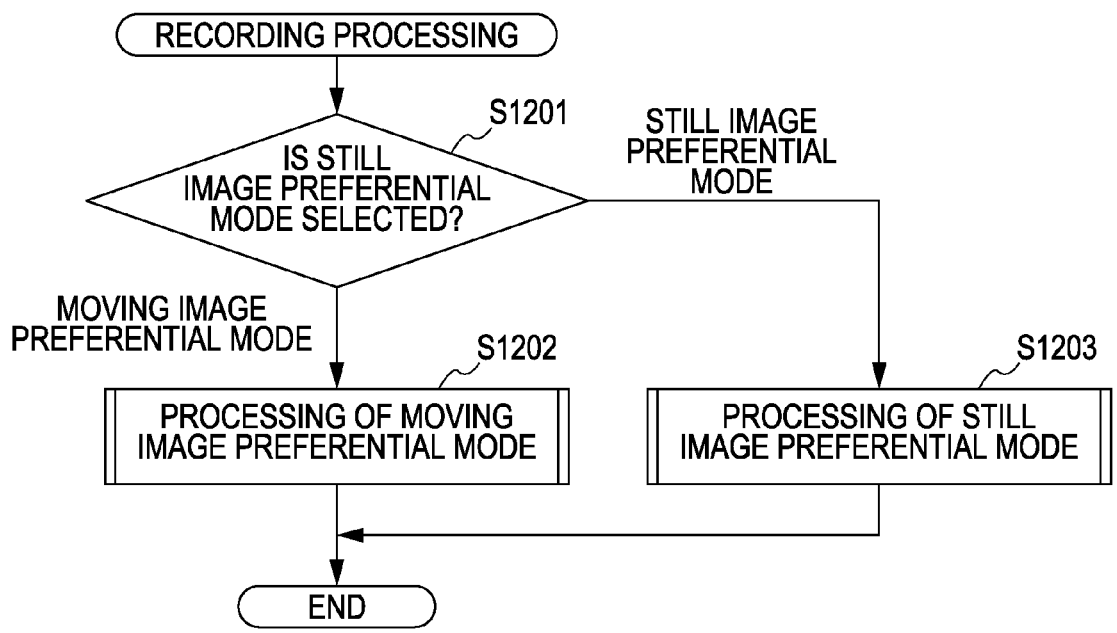
FIG. 12 is a flowchart showing recording processing.

FIG. 12 is a flowchart showing recording processing according to this exemplary embodiment. The system control unit 111 controls each unit to execute the processing shown in FIG. 12.

If a user instructs starting of recording of moving images, the system control unit 111 determines whether the moving image preferential mode or the still image preferential mode is selected (S1201). If the moving image preferential mode is selected, the system control unit 111 executes processing for the moving image preferential mode at STEP S1202.

In this moving image preferential mode, processing similar to that shown in FIGS. 7 and 8 described in the first exemplary embodiment is executed.

If the still image preferential mode is selected, processing for the still image preferential mode is executed at STEP S1203. In this still image preferential mode, processing similar to that shown in FIGS. 10 and 11 described in the fourth exemplary embodiment is executed.

Other exemplary embodiments of the present invention will now be described. Each unit included in the apparatuses and each step of the methods according to the above-described exemplary embodiments of the present invention can be realized by execution of a program stored in a random access memory (RAM) or a read-only memory (ROM) of a computer. The program and a computer-readable recording medium storing the program are also included in the present invention.

The present invention can be embodied as, for example, a system, an apparatus, a method, a program, or a recording medium. More specifically, the present invention may be applied to a system including a plurality of devices or an apparatus including one device.

The present invention also includes a case where software programs for realizing functions of the above-described exemplary embodiments (programs corresponding to the flowcharts shown in FIGS. 6-8 and 10-12 of the exemplary embodiments) are supplied to the system or the apparatus directly or from a remote place. A computer included in the system or the apparatus reads out and executes program codes of the supplied software program, whereby the functions of the above-described exemplary embodiments are achieved. Such a case is also included in the present invention.

Accordingly, the program codes to be installed in the computer to realize the functions of the present invention in the computer are also included in the present invention. That is, the present invention includes a computer program for realizing the functions of the present invention.

In this case, the computer program may be in any form, such as an object code, a program executed by an interpreter, or script data supplied to an OS, as long as the program has the functions of the program.

Types of a computer-readable recording medium for use in supplying the computer program include, for example, a flexible disk, a hard disk, an optical disc such as a CD-ROM, a CD-R, a CD-RW, or a DVD (DVD-ROM, DVD-R), a magneto-optical disk such as an MO, a magnetic tape, a nonvolatile memory card, and a ROM.

In addition, the program supplying method includes a case where a user accesses an Internet web site using a browser of a client computer and downloads the computer program according to an exemplary embodiment of the present invention to a recording medium, such as a hard disk, from the web site. In this case, the downloaded program may be a compressed file having an automatic installation function.

Additionally, program codes constituting the program according to the exemplary embodiment of the present invention may be divided into a plurality of files and each of the plurality of files may be downloaded from different web sites, whereby the present invention can be realized. That is, the present invention also includes a WWW server that allows a plurality of users to download program files for realizing the functions of the present invention in a computer.

The program according to the exemplary embodiment of the present invention may be encrypted and recorded on a recording medium, such as a CD-ROM, and the recording medium may be distributed to users. In this case, users satisfying a predetermined condition may be permitted to download key information for decrypting the encryption from a web site via the Internet, execute the encrypted program using the key information, and install the program in a computer.

In addition to realization of the functions according to the above-described exemplary embodiments by the computer's execution of the read out program codes, an operating system running on the computer may execute part of or all of actual processing on the basis of instructions of the program codes, whereby the functions of the exemplary embodiments may be realized.

Furthermore, the program read out from a recording medium may be written in a memory of a function expansion board inserted into the computer or a function expansion unit connected to the computer. A CPU or the like included in the function expansion board or the function expansion unit may execute part of or all of actual processing on the basis of instructions of the program, thereby realizing the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions. This application claims the benefit of Japanese Patent Application No. 2008-070420 filed on Mar. 18, 2008, and Japanese Patent Application No. 2009-046424 filed on Feb. 27, 2009, which are hereby incorporated by reference herein in their entirety.

What is claimed is:

1. An imaging apparatus comprising:
an imaging unit;
a signal processing unit configured to generate moving image data and still image data using image data output from the imaging unit;
a moving image coding unit configured to encode the moving image data to compress an information amount of the moving image data;
a still image coding unit configured to encode the still image data to compress an information amount of the still image data;
a recording unit configured to record the moving image data encoded by the moving image coding unit and the still image data encoded by the still image coding unit on a recording medium;
a setting unit configured to set a data rate of the moving image data to be encoded by the moving image coding unit; and
a control unit configured to control the moving image coding unit and the still image coding unit, the control unit controlling the moving image coding unit on the basis of the data rate set by the setting unit to adjust a data rate of the moving image data, the control unit controlling the still image coding unit on the basis of the data rate set by the setting unit and a recording data rate of the recording medium to adjust an amount of the still image data,
wherein the signal processing unit generates the still image data in response to a still image shooting instruction issued during recording of the moving image data,
wherein the recording unit records the still image data on the recording medium during recording of the moving image data, and
wherein the control unit adjusts, on the basis of the set data rate and the recording data rate of the recording medium, an amount of the still image data generated during recording of the moving image data.

2. The apparatus according to claim 1, wherein the control unit adjusts the amount of the still image data on the basis of a difference between the recording data rate of the recording medium and the set data rate.

3. The apparatus according to claim 1,
wherein the signal processing unit generates still image data of N frames in unit time, and
wherein the control unit adjusts the amount of the still image data so that still image data of each of N frames has the same information amount.

4. The apparatus according to claim 1, wherein the setting unit selects one of a plurality of predetermined data rates in accordance with a user operation.

5. The apparatus according to claim 1,
wherein the signal processing unit generates the still image data in response to a still image shooting instruction issued when the moving image data is not recorded, and
wherein the control unit controls the still image coding unit so that the still image data generated by the signal processing unit is encoded regardless of the set data rate when the moving image data is not recorded.

6. The apparatus according to claim 5,
wherein the setting unit sets an image quality of the still image data to be recorded when the moving image data is not recorded to a given value, and
wherein the control unit controls the still image coding unit on the basis of the image quality of the still image data set by the setting unit.

7. The apparatus according to claim 6,
wherein the still image coding unit includes a quantizer configured to quantize the still image data, and
wherein the control unit adjusts a quantization step of the quantizer on the basis of the set image quality.

8. An imaging apparatus comprising:
an imaging unit;
a signal processing unit configured to generate moving image data and still image data using image data output from the imaging unit;
a moving image coding unit configured to encode the moving image data to compress an information amount of the moving image data;
a still image coding unit configured to encode the still image data to compress an information amount of the still image data;
a recording unit configured to record the moving image data encoded by the moving image coding unit and the still image data encoded by the still image coding unit on a recording medium;
a setting unit configured to set a data rate of the moving image data to be encoded by the moving image coding unit; and
a control unit configured to control the moving image coding unit and the still image coding unit, the control unit controlling the moving image coding unit on the basis of the data rate set by the setting unit to adjust a data rate of the moving image data, the control unit controlling the still image coding unit on the basis of the data rate set by the setting unit and a recording data rate of the recording medium to adjust an amount of the still image data, wherein the signal processing unit generates the still image data in response to a still image shooting instruction issued during recording of the moving image data, and wherein the control unit adjusts an amount of the still image data to be encoded by the still image coding unit so that the encoded still image data can be recorded during recording of the moving image data.

9. The apparatus according to claim 8, wherein the control unit adjusts the amount of the still image data on the basis of a difference between the recording data rate of the recording medium and the set data rate.

10. The apparatus according to claim 8,
wherein the signal processing unit generates still image data of N frames in unit time, and
wherein the control unit adjusts the amount of the still image data so that still image data of each of N frames has the same information amount.

11. The apparatus according to claim 8, wherein the setting unit selects one of a plurality of predetermined data rates in accordance with a user operation.

12. The apparatus according to claim 8,
wherein the signal processing unit generates the still image data in response to a still image shooting instruction issued when the moving image data is not recorded, and
wherein the control unit controls the still image coding unit so that the still image data generated by the signal processing unit is encoded regardless of the set data rate when the moving image data is not recorded.

13. The apparatus according to claim 8,
wherein the setting unit sets an image quality of the still image data to be recorded when the moving image data is not recorded to a given value, and
wherein the control unit controls the still image coding unit on the basis of the image quality of the still image data set by the setting unit.

14. The apparatus according to claim 8,
wherein the still image coding unit includes a quantizer configured to quantize the still image data, and
wherein the control unit adjusts a quantization step of the quantizer on the basis of the set image quality.

15. An imaging apparatus comprising:
an imaging unit;
a signal processing unit configured to generate moving image data and still image data using image data output from the imaging unit;
a moving image coding unit configured to encode the moving image data to compress an information amount of the moving image data;
a still image coding unit configured to encode the still image data to compress an information amount of the still image data;
a recording unit configured to record the moving image data encoded by the moving image coding unit and the still image data encoded by the still image coding unit on a recording medium;
a setting unit configured to set an image quality of the still image data to be encoded by the still image coding unit; and
a control unit configured to control the moving image coding unit and the still image coding unit, the control unit controlling the still image coding unit on the basis of the image quality set by the setting unit to adjust an amount of the still image data, the control unit controlling the moving image coding unit on the basis of the amount of the still image data encoded in accordance with the set image quality and a recording data rate of the recording medium to adjust a data rate of the moving image data, wherein the signal processing unit generates the still image data in response to a still image shooting instruction issued during recording of the moving image data, and wherein the recording unit records the still image data on the recording medium during recording of the moving image data, wherein the control unit adjusts the data rate of the moving image data on the basis of the amount of the still image data encoded during recording of the moving image data and the recording data rate of the recording medium.

16. The apparatus according to claim 15, wherein the control unit adjusts the data rate of the moving image data on the basis of a difference between the recording data rate of the recording medium and the amount of the still image data.

17. The apparatus according to claim 15, wherein the setting unit selects one of a plurality of predetermined image qualities in accordance with a user operation.

18. The apparatus according to claim 17,
wherein the setting unit sets the data rate of the moving image data to a given value, and
wherein the control unit adjusts the data rate of the moving image data on the basis of the data rate set by the setting unit in response to an instruction for starting recording of the moving image data, and adjusts the data rate of the moving image data on the basis of the amount of the still image data encoded during recoding of the moving image data and the recording data rate of the recording medium in response to a still image shooting instruction issued during recording of the moving image data.

19. The apparatus according to claim 18, wherein the control unit adjusts the data rate of the moving image data on the basis of the data rate set by the setting unit after the recording unit finishes recording the still image data.

20. The apparatus according to claim 15,
wherein the still image coding unit includes a quantizer configured to quantize the still image data, and
wherein the control unit adjusts a quantization step of the quantizer on the basis of the set image quality.

21. An imaging apparatus comprising:
an imaging unit;
a signal processing unit configured to generate moving image data and still image data using image data output from the imaging unit;
a moving image coding unit configured to encode the moving image data to compress an information amount of the moving image data
a still image coding unit configured to encode the still image data to compress an information amount of the still image data;
a recording unit configured to record the moving image data encoded by the moving image coding unit and the still image data encoded by the still image coding unit on a recording medium;
a setting unit configured to set an image quality of the still image data to be encoded by the still image coding unit; and
a control unit configured to control the moving image coding unit and the still image coding unit, the control unit controlling the still image coding unit on the basis of the image quality set by the setting unit to adjust an amount of the still image data, the control unit controlling the moving image coding unit on the basis of the amount of the still image data encoded in accordance with the set image quality and a recording data rate of the recording medium to adjust a data rate of the moving image data, wherein the signal processing unit generates the still image data in response to a still image shooting instruction issued during recording of the moving image data, and wherein the control unit adjusts the data rate of the moving image data to be encoded by the moving image coding unit so that the coded still image data can be recorded during recording of the moving image data.

22. The apparatus according to claim 21, wherein the control unit adjusts the data rate of the moving image data on the basis of a difference between the recording data rate of the recording medium and the amount of the still image data.

23. The apparatus according to claim 21, wherein the setting unit selects one of a plurality of predetermined image qualities in accordance with a user operation.

24. The apparatus according to claim 21,
wherein the setting unit sets the data rate of the moving image data to a given value, and
wherein the control unit adjusts the data rate of the moving image data on the basis of the data rate set by the setting unit in response to an instruction for starting recording of the moving image data, and adjusts the data rate of the moving image data on the basis of the amount of the still image data encoded during recoding of the moving image data and the recording data rate of the recording medium in response to a still image shooting instruction issued during recording of the moving image data.

25. The apparatus according to claim 21, wherein the control unit adjusts the data rate of the moving image data on the basis of the data rate set by the setting unit after the recording unit finishes recording the still image data.

26. The apparatus according to claim 21,
wherein the still image coding unit includes a quantizer configured to quantize the still image data, and
wherein the control unit adjusts a quantization step of the quantizer on the basis of the set image quality.

27. An imaging apparatus comprising:
an imaging unit;
a signal processing unit configured to generate moving image data and still image data using image data output from the imaging unit;
a moving image coding unit configured to encode the moving image data to compress an information amount of the moving image data;
a still image coding unit configured to encode the still image data to compress an information amount of the still image data;
a recording unit configured to record the moving image data encoded by the moving image coding unit and the still image data encoded by the still image coding unit on a recording medium;
a setting unit configured to set a data rate of the moving image data to be encoded by the moving image coding unit and an image quality of the still image data to be encoded by the still image coding unit;
a selecting unit configured to select one of a first mode and a second mode; and
a control unit configured to control the moving image coding unit and the still image coding unit in accordance with the mode selected by the selecting unit,
wherein, in the first mode, the control unit controls the moving image coding unit on the basis of the data rate set by the setting unit to adjust the data rate of the moving image data and controls the still image coding unit on the basis of the set data rate and a recording data rate of the recording medium to adjust an amount of the still image data, and
wherein, in the second mode, the control unit controls the still image coding unit on the basis of the image quality set by the setting unit to adjust the amount of the still image data and controls the moving image coding unit on the basis of the amount of the still image data encoded in accordance with the set image quality and the recording data rate of the recording medium to adjust the data rate of the moving image data,
wherein the signal processing unit generates the still image data in response to a still image shooting instruction issued during recording of the moving image data, and
wherein the control unit adjusts the amount of the still image data to be encoded by the still image coding unit so that the coded still image data can be recorded during recording of the moving image data in the first mode.

28. An imaging apparatus comprising:
an imaging unit;
a signal processing unit configured to generate moving image data and still image data using image data output from the imaging unit;
a moving image coding unit configured to encode the moving image data to compress an information amount of the moving image data;
a still image coding unit configured to encode the still image data to compress an information amount of the still image data;
a recording unit configured to record the moving image data encoded by the moving image coding unit and the still image data encoded by the still image coding unit on a recording medium;
a setting unit configured to set a data rate of the moving image data to be encoded by the moving image coding unit and an image quality of the still image data to be encoded by the still image coding unit;
a selecting unit configured to select one of a first mode and a second mode; and
a control unit configured to control the moving image coding unit and the still image coding unit in accordance with the mode selected by the selecting unit,
wherein, in the first mode, the control unit controls the moving image coding unit on the basis of the data rate set by the setting unit to adjust the data rate of the moving image data and controls the still image coding unit on the basis of the set data rate and a recording data rate of the recording medium to adjust an amount of the still image data,
wherein, in the second mode, the control unit controls the still image coding unit on the basis of the image quality set by the setting unit to adjust the amount of the still image data and controls the moving image coding unit on the basis of the amount of the still image data encoded in accordance with the set image quality and the recording data rate of the recording medium to adjust the data rate of the moving image data,
wherein the signal processing unit generates the still image data in response to a still image shooting instruction issued during recording of the moving image data, and
wherein the control unit adjusts the data rate of the moving image data to be encoded by the moving image coding unit so that the coded still image data can be recorded during recording of the moving image data in the second mode.

29. A method performed in an imaging apparatus including an imaging unit, the method comprising:

via signal processing unit, generating moving image data and still image data using image data output from the imaging unit;

via a moving image coding unit, encoding the moving image data to compress an information amount of the moving image data;

via a still image coding unit, encoding the still image data to compress an information amount of the still image data;

via a recording unit, recording the moving image data encoded by the moving image coding unit and the still image data encoded by the still image coding unit on a recording medium;

via a setting unit, setting a data rate of the moving image data to be encoded by the moving image coding unit; and via a control unit, controlling the moving image coding unit and the still image coding unit, the control unit controlling the moving image coding unit on the basis of the data rate set by the setting unit to adjust a data rate of the moving image data, the control unit controlling the still image coding unit on the basis of the data rate set by the setting unit and a recording data rate of the recording medium to adjust an amount of the still image data, wherein the signal processing unit generates the still image data in response to a still image shooting instruction issued during recording of the moving image data, wherein the recording unit records the still image data on the recording medium during recording of the moving image data, and wherein the control unit adjusts, on the basis of the set data rate and the recording data rate of the recording medium, an amount of the still image data generated during recording of the moving image data.

30. A method performed in an imaging apparatus including an imaging unit, the method comprising:

via a signal processing unit, generating moving image data and still image data using image data output from the imaging unit;

via a moving image coding unit, encoding the moving image data to compress an information amount of the moving image data;

via a still image coding unit, encoding the still image data to compress an information amount of the still image data;

via a recording unit, recording the moving image data encoded by the moving image coding unit and the still image data encoded by the still image coding unit on a recording medium;

via s setting unit, setting a data rate of the moving image data to be encoded by the moving image coding unit; and via a control unit, controlling the moving image coding unit and the still image coding unit, the control unit controlling the moving image coding unit on the basis of the data rate set by the setting unit to adjust a data rate of the moving image data, the control unit controlling the still image coding unit on the basis of the data rate set by the setting unit and a recording data rate of the recording medium to adjust an amount of the still image data, wherein the signal processing unit generates the still image data in response to a still image shooting instruction issued during recording of the moving image data, and wherein the control unit adjusts an amount of the still image data to be encoded by the still image coding unit so that the encoded still image data can be recorded during recording of the moving image data.

31. A method performed in an imaging apparatus including an imaging unit, the method comprising:

via a signal processing unit, generating moving image data and still image data using image data output from the imaging unit;

via a moving image coding unit, encoding the moving image data to compress an information amount of the moving image data;

via a still image coding unit, encoding the still image data to compress an information amount of the still image data;

via a recording unit, recording the moving image data encoded by the moving image coding unit and the still image data encoded by the still image coding unit on a recording medium;

via a setting unit, setting an image quality of the still image data to be encoded by the still image coding unit; and via a control unit, controlling the moving image coding unit and the still image coding unit, the control unit controlling the still image coding unit on the basis of the image quality set by the setting unit to adjust an amount of the still image data, the control unit controlling the moving image coding unit on the basis of the amount of the still image data encoded in accordance with the set image quality and a recording data rate of the recording medium to adjust a data rate of the moving image data, wherein the signal processing unit generates the still image data in response to a still image shooting instruction issued during recording of the moving image data, and wherein the recording unit records the still image data on the recording medium during recording of the moving image data, wherein the control unit adjusts the data rate of the moving image data on the basis of the amount of the still image data encoded during recording of the moving image data and the recording data rate of the recording medium.

32. A method performed in an imaging apparatus including an imaging unit, the method comprising:

via a signal processing unit, generating moving image data and still image data using image data output from the imaging unit;

via a moving image coding unit, encoding the moving image data to compress an information amount of the moving image data;

via a still image coding unit, encoding the still image data to compress an information amount of the still image data;

via a recording unit, recording the moving image data encoded by the moving image coding unit and the still image data encoded by the still image coding unit on a recording medium;

a setting unit configured to set an image quality of the still image data to be encoded by the still image coding unit; and via a control unit, controlling the moving image coding unit and the still image coding unit, the control unit controlling the still image coding unit on the basis of the image quality set by the setting unit to adjust an amount of the still image data, the control unit controlling the moving image coding unit on the basis of the amount of the still image data encoded in accordance with the set image quality and a recording data rate of the recording medium to adjust a data rate of the moving image data, wherein the signal processing unit generates the still image data in response to a still image shooting instruction issued during recording of the moving image data, and wherein the control unit adjusts the data rate of the moving image data to be encoded by the moving image coding unit so that the coded still image data can be recorded during recording of the moving image data.

33. A method performed in an imaging apparatus including an imaging unit, the method comprising:
- via a signal processing unit, generating moving image data and still image data using image data output from the imaging unit;
- via a moving image coding unit, encoding the moving image data to compress an information amount of the moving image data;
- via a still image coding unit, encoding the still image data to compress an information amount of the still image data;
- via a recording unit, recording the moving image data encoded by the moving image coding unit and the still image data encoded by the still image coding unit on a recording medium;
- via a setting unit, setting a data rate of the moving image data to be encoded by the moving image coding unit and an image quality of the still image data to be encoded by the still image coding unit;
- via a selecting unit, selecting one of a first mode and a second mode; and
- via a control unit, controlling the moving image coding unit and the still image coding unit in accordance with the mode selected by the selecting unit,
- wherein, in the first mode, the control unit controls the moving image coding unit on the basis of the data rate set by the setting unit to adjust the data rate of the moving image data and controls the still image coding unit on the basis of the set data rate and a recording data rate of the recording medium to adjust an amount of the still image data, and
- wherein, in the second mode, the control unit controls the still image coding unit on the basis of the image quality set by the setting unit to adjust the amount of the still image data and controls the moving image coding unit on the basis of the amount of the still image data encoded in accordance with the set image quality and the recording data rate of the recording medium to adjust the data rate of the moving image data,
- wherein the signal processing unit generates the still image data in response to a still image shooting instruction issued during recording of the moving image data, and
- wherein the control unit adjusts the amount of the still image data to be encoded by the still image coding unit so that the coded still image data can be recorded during recording of the moving image data in the first mode.

34. A method performed in an imaging apparatus including an imaging unit, the method comprising:
- via a signal processing unit, generating moving image data and still image data using image data output from the imaging unit;
- via a moving image coding unit configured to encode the moving image data to compress an information amount of the moving image data;
- via a still image coding unit, encoding the still image data to compress an information amount of the still image data;
- via a recording unit, recording the moving image data encoded by the moving image coding unit and the still image data encoded by the still image coding unit on a recording medium;
- via a setting unit, setting a data rate of the moving image data to be encoded by the moving image coding unit and an image quality of the still image data to be encoded by the still image coding unit;
- via a selecting unit, selecting one of a first mode and a second mode; and
- via a control unit configured to control the moving image coding unit and the still image coding unit in accordance with the mode selected by the selecting unit,
- wherein, in the first mode, the control unit controls the moving image coding unit on the basis of the data rate set by the setting unit to adjust the data rate of the moving image data and controls the still image coding unit on the basis of the set data rate and a recording data rate of the recording medium to adjust an amount of the still image data,
- wherein, in the second mode, the control unit controls the still image coding unit on the basis of the image quality set by the setting unit to adjust the amount of the still image data and controls the moving image coding unit on the basis of the amount of the still image data encoded in accordance with the set image quality and the recording data rate of the recording medium to adjust the data rate of the moving image data,
- wherein the signal processing unit generates the still image data in response to a still image shooting instruction issued during recording of the moving image data, and
- wherein the control unit adjusts the data rate of the moving image data to be encoded by the moving image coding unit so that the coded still image data can be recorded during recording of the moving image data in the second mode.

* * * * *